(12) United States Patent
Inuga et al.

(10) Patent No.: US 10,352,581 B2
(45) Date of Patent: Jul. 16, 2019

(54) CONTROL APPARATUS FOR CONTROLLING AN ELECTRIC FACILITY DEVICE INSTALLED AT A PROPERTY

(71) Applicant: DAIKIN INDUSTRIES, LTD., Osaka-shi, Osaka (JP)

(72) Inventors: Shinya Inuga, Settsu (JP); Wakiko Sunamori, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/568,415

(22) PCT Filed: Apr. 22, 2016

(86) PCT No.: PCT/JP2016/062705
§ 371 (c)(1),
(2) Date: Oct. 20, 2017

(87) PCT Pub. No.: WO2016/171234
PCT Pub. Date: Oct. 27, 2016

(65) Prior Publication Data
US 2018/0299160 A1   Oct. 18, 2018

(30) Foreign Application Priority Data
Apr. 24, 2015  (JP) .................................. 2015-089617

(51) Int. Cl.
*F24F 11/47*  (2018.01)
*G06Q 30/02*  (2012.01)
(Continued)

(52) U.S. Cl.
CPC .............. *F24F 11/47* (2018.01); *F24F 11/58* (2018.01); *G05B 19/0428* (2013.01); *G06Q 30/02* (2013.01); *G06Q 50/06* (2013.01)

(58) Field of Classification Search
CPC ....... F24F 11/47; F24F 11/58; G05B 19/0428; G06Q 30/02; G06Q 50/06
See application file for complete search history.

(56) References Cited

U.S. PATENT DOCUMENTS

2008/0135634 A1* 6/2008 Murakami ............... F24F 11/30
  236/51
2014/0188295 A1  7/2014 Saito et al.
2015/0330645 A1* 11/2015 Speranzon ............. G06Q 10/04
  700/276

FOREIGN PATENT DOCUMENTS

EP  3 016 229 A1   5/2016
JP  2012-63054 A   3/2012
(Continued)

OTHER PUBLICATIONS

European Search Report of corresponding EP Application No. 16 78 3255.9 dated Jan. 24, 2018.
(Continued)

*Primary Examiner* — Nathan L Laughlin
(74) *Attorney, Agent, or Firm* — Global IP Counselors, LLP

(57) ABSTRACT

A control apparatus controls a facility device and is used in an energy consumption management system that grants an incentive to a user of the facility device when the facility device performs an adjustment of energy consumption for an adjustment period in response to an adjustment request. The control apparatus includes an incentive standard setting unit, a comfort standard setting unit, an incentive prediction calculation unit, a comfort prediction calculation unit, a control condition change unit, and a control unit. The control condition change unit determines whether incentive and comfort predictions are within ranges of incentive and comfort standards, and changes a preset control condition when there is variation in a derivation element of the
(Continued)

incentive during the adjustment period. The control unit controls the facility device based on the control condition changed by the control condition change unit after the variation has occurred in the derivation element.

16 Claims, 27 Drawing Sheets

(51) Int. Cl.
*G06Q 50/06* (2012.01)
*F24F 11/58* (2018.01)
*G05B 19/042* (2006.01)

(56) References Cited

FOREIGN PATENT DOCUMENTS

| | | |
|---|---|---|
| JP | 2014-96946 A | 5/2014 |
| WO | 2014/141354 A1 | 9/2014 |
| WO | 2014/208059 A1 | 12/2014 |

OTHER PUBLICATIONS

International Preliminary Report of corresponding PCT Application No. PCT/JP2016/062705 dated Nov. 2, 2017.
International Search Report of corresponding PCT Application No. PCT/JP2016/062705 dated Jul. 12, 2016.

\* cited by examiner

CONTROL APPARATUS FOR CONTROLLING AN ELECTRIC FACILITY DEVICE INSTALLED AT A PROPERTY

CROSS-REFERENCE TO RELATED APPLICATIONS

This U.S. National stage application claims priority under 35 U.S.C. § 119(a) to Japanese Patent Application No. 2015-089617, filed in Japan on Apr. 24, 2015, the entire contents of which are hereby incorporated herein by reference.

TECHNICAL FIELD

The present invention relates to a control apparatus that controls facility devices, which is used in energy consumption management systems that grant incentives to users of the facility devices.

BACKGROUND ART

In the past, research has been conducted on power adjustment techniques for adjusting amounts of power consumption. For example, Japanese Patent Application Publication No. 2012-63054 describes controlling demand to suppress the amount of power consumption without negatively affecting the comfort of a space.

Recently, research has been conducted on demand-response control for the purpose of achieving demand-response. One mode of demand-response involves power suppliers or the like granting incentives (e.g. money, reductions of electricity rates) to users (power consumers) of facility devices in order to promote adjustments in the amount of power consumption of the facility devices and, as a result, contribute to the stable supply of power.

SUMMARY

Technical Problem

In the mode of demand-response described above, the derivation element of the incentive may vary during the period in which the amount of power consumption is being adjusted. Such changes may result in the user not earning the expected incentive.

As such, an object of the present invention is to provide a control apparatus that controls facility devices such that the user earns the expected incentive, even when there is variation in the derivation element of the incentive.

Solutions to Problem

A control apparatus according to a first aspect of the present invention is used in an energy consumption management system that grants an incentive to a user of a facility device when the facility device performs an adjustment of an amount of energy consumption for a predetermined adjustment period in response to an adjustment request. The control apparatus controls the facility device. The control apparatus is provided with a control condition change unit and a control unit. The control condition change unit changes a preset control condition of the facility device when there is variation in a derivation element of the incentive during the adjustment period. After the variation has occurred in the derivation element of the incentive, the control unit controls the facility device on the basis of a control condition changed by the control condition change unit.

According to this control apparatus, when there is variation in the derivation element of the incentive during the adjustment period of the amount of energy consumption, the preset control condition of the facility device is changed, and the facility device is controlled on the basis of the changed control condition. As a result of this configuration, the facility device can be controlled in the way that the user earns the expected incentive, even when there is variation in the derivation element of the incentive.

A control apparatus according to a second aspect of the present invention is the control apparatus according to the first aspect, further provided with an incentive standard setting unit and an incentive prediction calculation unit. The incentive standard setting unit receives a setting of an incentive standard which is a standard of the incentive. The incentive prediction calculation unit changes the preset control condition of the facility device and calculates an incentive prediction indicating a prediction of the incentive when there is variation in the derivation element of the incentive during the adjustment period. The control condition change unit determines the control condition of the facility device on the basis of the incentive prediction and the incentive standard.

According to this control apparatus, when there is variation in the derivation element of the incentive during the adjustment period of the amount of energy consumption, the incentive prediction is calculated by changing the preset control condition of the facility device, and the control condition of the facility device is determined on the basis of this incentive prediction and the preset incentive standard. As a result of this configuration, the facility device can be controlled in the way that the user earns an incentive that satisfies the incentive standard, even when there is variation in the derivation element of the incentive.

A control apparatus according to a third aspect of the present invention is the control apparatus according to the second aspect, further provided with a comfort standard setting unit and a comfort prediction calculation unit. The comfort standard setting unit receives a setting of a comfort standard indicating comfort of a space around the facility device. The comfort prediction calculation unit changes the preset control condition of the facility device and calculates a comfort prediction indicating the comfort when there is variation in the derivation element of the incentive during the adjustment period. The control condition change unit determines the control condition of the facility device on the basis of the comfort prediction and the comfort standard.

According to this control apparatus, when there is variation in the derivation element of the incentive during the adjustment period of the amount of energy consumption, the comfort prediction is calculated by changing the preset control condition of the facility device, and the control condition of the facility device is determined on the basis of this comfort prediction and the preset comfort standard. As a result of this configuration, the facility device can be controlled in the way that the user earns the expected incentive, without negatively affecting the comfort.

A control apparatus according to a fourth aspect of the present invention is the control apparatus according to the third aspect, further provided with a priority setting unit. The priority setting unit receives a setting of a priority indicating which of the incentive standard and the comfort standard is to be prioritized. The control condition change unit determines the control condition of the facility device on the basis of the incentive prediction, the incentive standard, the comfort prediction, the comfort standard, and the priority.

According to this control apparatus, the setting of the priority is received. the priority indicates which of the incentive standard and the comfort standard is to be prioritized. As a result of this configuration, the facility device can be controlled in accordance with user preferences.

A control apparatus according to a fifth aspect of the present invention is the control apparatus according to any of the second to fourth aspects, wherein the incentive prediction calculation unit sequentially changes the preset control condition of the facility device to a plurality of control conditions and calculates a plurality of incentive predictions when there is variation in the derivation element of the incentive. In this case, the control condition change unit determines the control condition of the facility device on the basis of the plurality of incentive predictions and the incentive standard.

According to this control apparatus, the plurality of incentive predictions is calculated with the preset control condition of the facility device changed to a plurality of control conditions sequentially, and the control condition of the facility device is determined on the basis of the plurality of incentive predictions and the preset incentive standard. As a result of this configuration, a control condition can be set whereby a more preferable incentive is earned. As a result, the facility device can be controlled such that an incentive corresponding to a user expectation is earned.

A control apparatus according to a sixth aspect of the present invention is the control apparatus according to any of the third to fifth aspects, wherein the comfort prediction calculation unit sequentially changes the preset control condition of the facility device to a plurality of control conditions and calculates a plurality of comfort predictions when there is variation in the derivation element of the incentive. The control condition change unit determines the control condition of the facility device on the basis of the plurality of comfort predictions and the comfort standard.

According to this control apparatus, the plurality of comfort predictions is calculated with the preset control condition of the facility device changed to a plurality of control conditions sequentially, and the control condition of the facility device is determined on the basis of the plurality of comfort predictions and the preset comfort standard. As a result of this configuration, a control condition can be set whereby a more preferable incentive and comfort are obtained. As a result, the facility device can be controlled such that an incentive and comfort that meet user expectations are obtained.

A control apparatus according to a seventh aspect of the present invention is the control apparatus according to any of the first to sixth aspects, further provided with a control condition storage unit. The control condition is stored in the control condition storage unit in association with a control state of the time the derivation element of the incentive varied. When there is variation in the derivation element of the incentive, the control condition change unit reads the control condition from the control condition storage unit on the basis of the control state.

According to this control apparatus, the control condition from the control condition storage unit is read on the basis of the control state when there is variation in the derivation element of the incentive. As a result of this configuration, it is possible to quickly determine the optimal control condition from historical data of past control conditions.

A control apparatus according to an eighth aspect of the present invention is the control apparatus according to any of the first to seventh aspects, wherein the control apparatus is connected to the facility device via a network.

According to this control apparatus, the control apparatus is connected to the facility device via a network. As a result, facility devices can be controlled at any location.

Advantageous Effects of Invention

With the control apparatus according to the first aspect of the present invention, it is possible to control the facility device so that the user receives the expected incentive, even when there is variation in the derivation element of the incentive.

With the control apparatus according to the second aspect, it is possible to control the facility device so that an incentive satisfying the incentive standard is received, even when there is variation in the derivation element of the incentive.

With the control apparatus according to the third aspect, it is possible to control the facility device so that the user receives the expected incentive.

With the control apparatus according to the fourth aspect, it is possible to control the facility device in accordance with user preferences.

With the control apparatus according to the fifth aspect, it is possible to control the facility device so that an incentive corresponding to user expectations is received.

With the control apparatus according to the sixth aspect, it is possible to control the facility device so that an incentive and comfort corresponding to user expectations are obtained.

With the control apparatus according to the seventh aspect, it is possible to quickly determine the optimal control condition from historical data of past control conditions.

With the control apparatus according to the eighth aspect, it is possible to control facility devices at any location.

DESCRIPTION OF EMBODIMENTS (1) Energy Supply Flow

Figure 1:
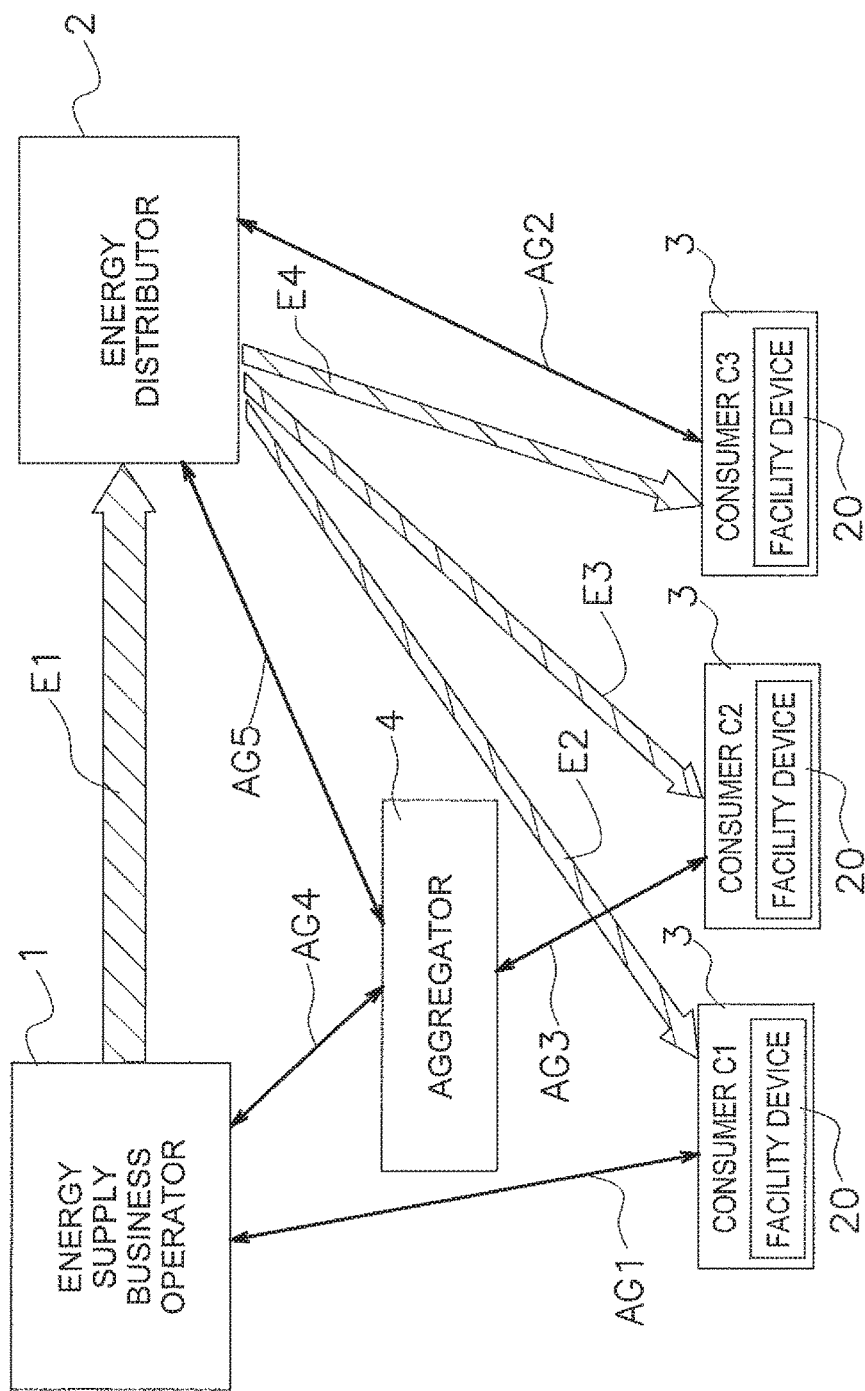
FIG. 1 is a drawing illustrating an energy supply flow.

FIG. 1 is a drawing illustrating an energy supply flow. In a typical case, as depicted by arrows E1 to E4 in FIG. 1, energy is sent from an energy supply business operator 1 to an energy distributor 2, and from the energy distributor 2 to facilities 3 of energy consumers C1 to C3. Then, the energy is consumed by facility devices 20 in the facilities 3.

Here, energy adjustment control is carried out to optimize the balance between the supply and demand of the energy. Demand-response control (described later) is one mode of energy adjustment control.

A premise of energy adjustment control is that the energy supplier and the energy consumer have entered into various contracts stipulating terms such as the amount of adjustment and adjustment period of the energy. As depicted by reference signs AG1 to AG5 in FIG. 1, contracts related to energy adjustment control are entered into by the energy supply business operator 1, the energy distributor 2, the consumers C1 to C3, and an aggregator 4.

Figure 2:
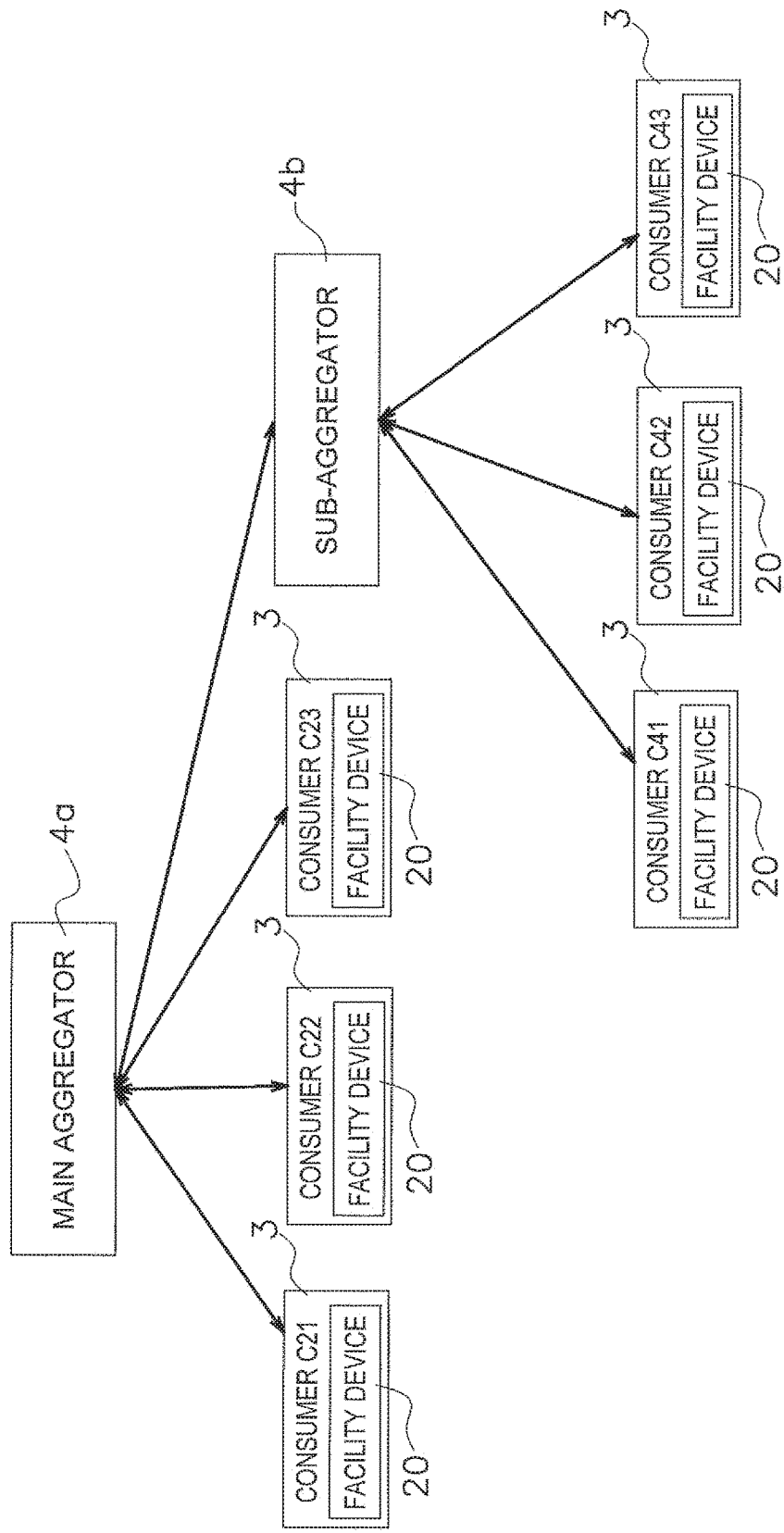
FIG. 2 is a drawing illustrating the relationship between aggregators and consumers.

Note that the energy supply business operator 1, the energy distributor 2, and the aggregator 4 are on the supplier side, and each may consist of one or multiple entities. Additionally, as illustrated in FIG. 2, the aggregator 4 may be structured hierarchically and include a main aggregator 4a and a sub-aggregator 4b. In FIG. 2, a case is depicted in which consumers C21 to C23 contract with the main aggregator 4a, and consumers C41 to C43 contract with the sub-aggregator 4b.

(2) Overview of Demand-Response Control

Demand-response (hereinafter also referred to as "DR") is a system in which energy is stably supplied by adjusting the energy usage amount on the consumer side in compliance with demands from the power supplier side. One mode of demand-response involves energy suppliers or the like granting incentives (e.g. money, reductions of electricity rates) to users (consumers) of the facility devices in order to promote adjustments in the amount of energy consumption of the facility devices. In order to realize such adjustments, a energy adjustment request is received from an external source at a desired timing, and the amount of energy consumption of the facility device is adjusted over a desired period in compliance with the energy adjustment request. In the present specification, this energy adjustment control of the facility devices is referred to as "demand-response control."

Figure 3A:
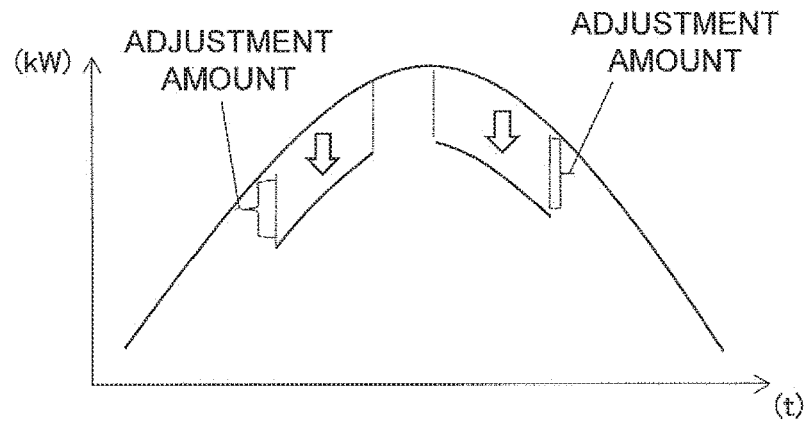
FIG. 3A is a drawing illustrating the concept of demand-response control.
Figure 3B:
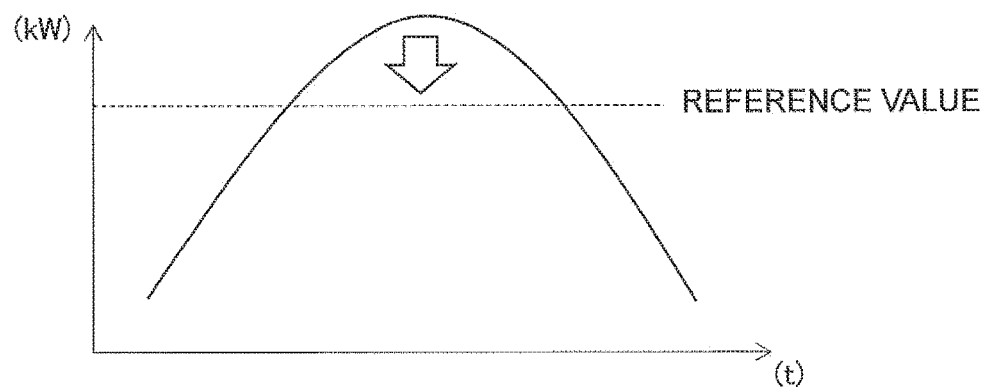
FIG. 3B is a drawing illustrating the concept of demand control.

Note that, as the technique of adjusting the energy on the consumer side, there is also a control referred to as "demand control," as described in Patent Literature 1 (Japanese Patent Application Publication No. 2012-63054). Demand-response control and demand control differ from each other on the points of control objectives, control specifics, and control timings. Specifically, in demand-response control, the control objective is to earn incentives that are paid for the adjustment amount, but in demand response, the control objective is to ensure that the maximum demand power that grounds for basic charges does not exceed a reference value. In demand-response control, the control specifics include controlling exactly the adjustment amount for the desired period (FIG. 3A), but in demand response, the control specifics include controlling such that the maximum consumed power per 30 minutes, for example, remains at or below a reference value (3B). For the control timing, control is carried out for a desired timing based on demands from the energy supplier in demand-response control, but control is carried out for a period of time during which peak demand occurs in demand control.

(3) Overall Configuration of the Energy Consumption Management System

Figure 4:
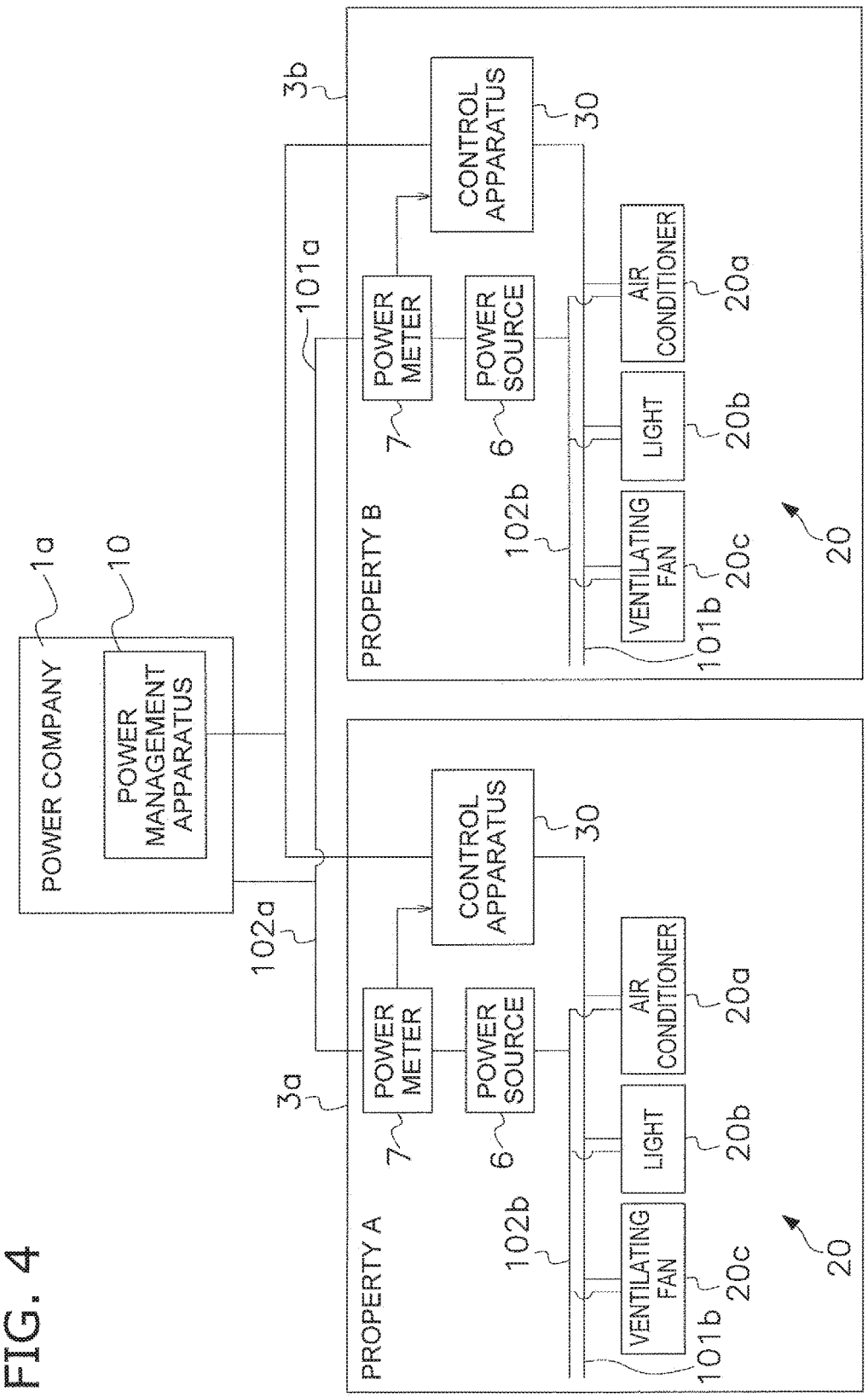
FIG. 4 is a schematic drawing explaining an energy consumption management system.

FIG. 4 is a schematic drawing explaining an energy consumption management system. For the sake of convenience, in the following description, the energy consumed by the facility device 20 is assumed to be electric power.

An energy consumption management system is a system in which an incentive is granted to a user of a facility device when the facility device 20 carries out an adjustment of the amount of power consumption for a predetermined adjustment period in compliance with an adjustment request from a power company 1a. The mode of the incentive is predetermined on the basis of a contract. This energy consumption management system is realized by a power supplier, namely the power company 1a, and devices installed at each property A and B of the consumer.

The power company 1a has a power management apparatus 10. The power management apparatus 10 sends energy adjustment requests to the facility devices 20. The power management apparatus 10 performs operations such as the calculation of the amount of incentive to be granted to the user from, for example, a record of compliance by the facility devices 20 to the adjustment requests.

Facilities 3a and 3b of the properties A and B may be office buildings, tenant buildings, factories, common residencies, or the like. Facility devices 20, a power source 6 that supplies power to the facility devices 20, a power meter 7 that measures the amount of power supplied from the power source 6 to the facility devices 20, and a control apparatus 30 that controls the facility devices 20 are installed at each of the properties A and B. Power is supplied from the power company 1a to the facilities 3a and 3b of the properties A and B via a power line 102a. Power is supplied from the power source 6 to the facility devices 20 installed at the same property via an indoor power line 102b. The power management apparatus 10 and the control apparatus 30 are connected to each other via an internet 101a, for example. The facility devices 20 and the control apparatus 30 at the same property are connected to each other by a dedicated control line 101b or the like.

Note that, in FIG. 4, two properties, namely A and B, are illustrated, but the number of properties is not limited thereto. Likewise, the number of devices is not limited to the example illustrated in FIG. 4.

(4) Devices Used in the Energy Consumption Management System

(4-1) Power Management Apparatus 10

Figure 5:
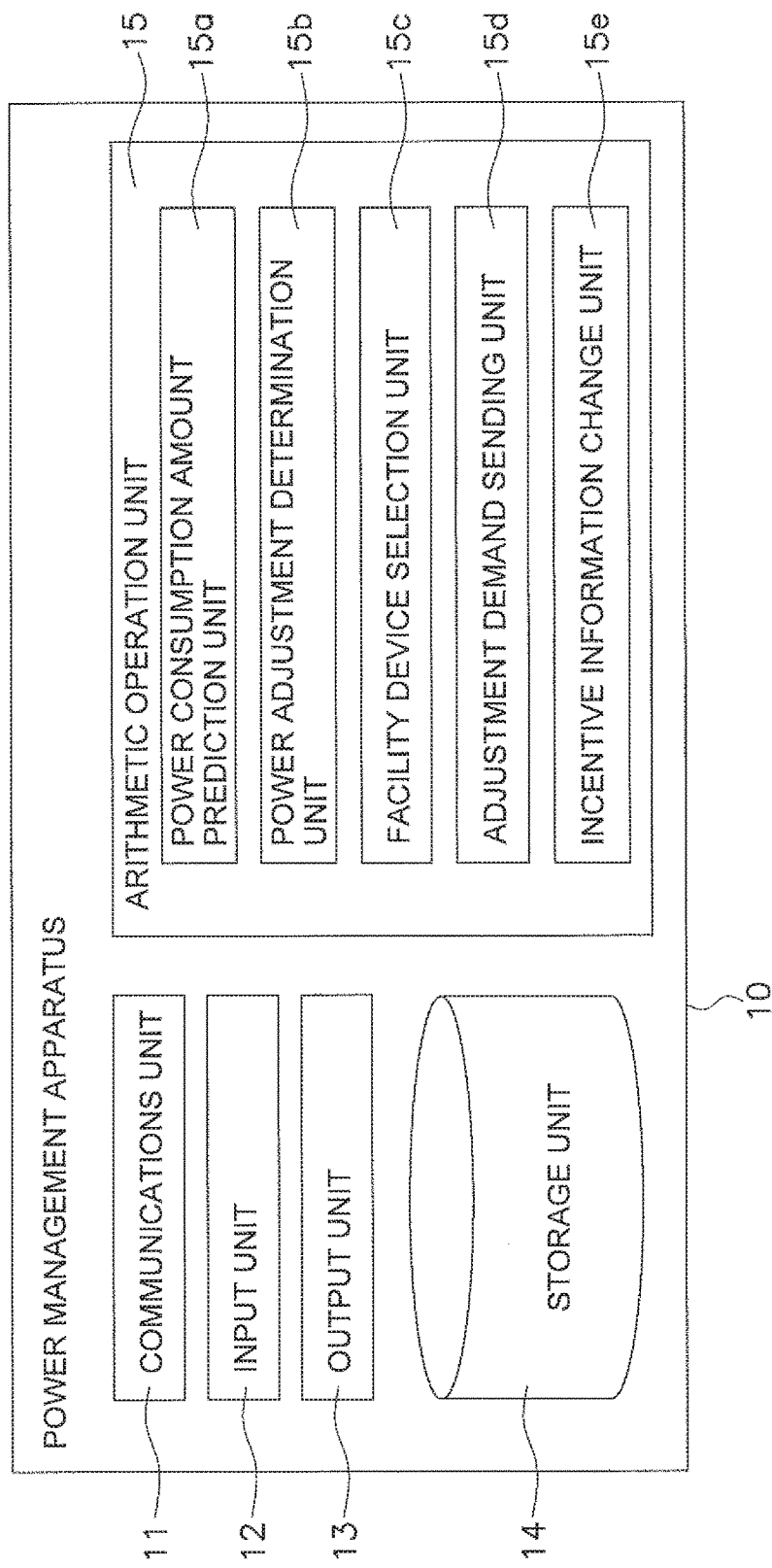
FIG. 5 is a schematic drawing illustrating a configuration of a power management apparatus 10.

FIG. 5 is a schematic drawing illustrating a configuration of the power management apparatus 10.

The power management apparatus 10 is provided with a communications unit 11, an input unit 12, an output unit 13, a storage unit 14, and an arithmetic operation unit 15.

(4-1-1) Communications Unit 11, Input Unit 12, Output Unit 13, and Storage Unit 14

The communications unit 11 is a component that communicates with the control apparatus 30, and is configured by a network interface and the like that enables the power management apparatus 10 to be connected to the internet 101a.

The input unit 12 is a component whereby information is input to the power management apparatus 10, and is configured from operation buttons, a keyboard, a mouse, and the like.

The output unit 13 is a component on which information stored in the power management apparatus 10 or other information is output, and is configured from a display or the like.

Figure 6:
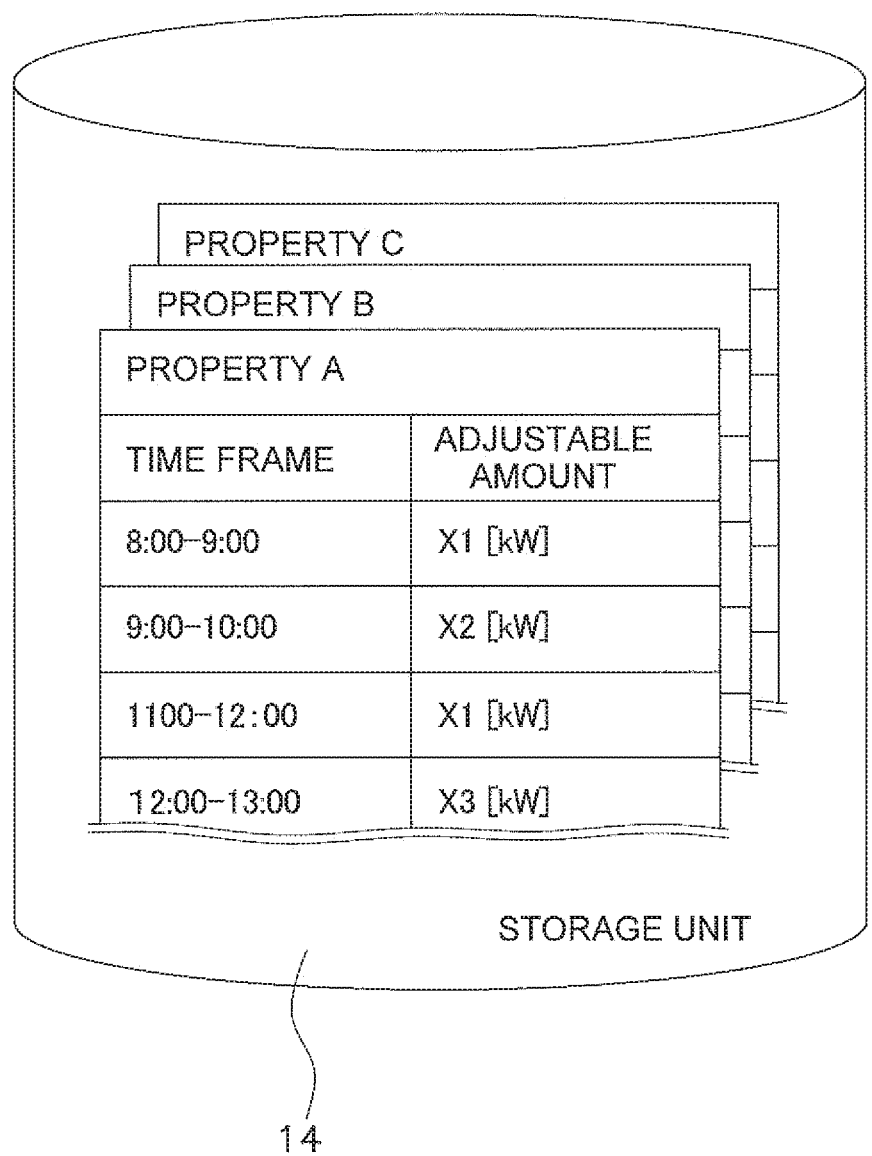
FIG. 6 is a schematic drawing illustrating a configuration of a storage unit 14.

The storage unit 14 is a component in which information input to the power management apparatus 10 or other information is stored, and is configured from a hard disk or the like. As illustrated in FIG. 6, the storage unit 14 stores, for each property, a combination of the adjustable amount of power and the adjustable time frame sent from each control apparatus 30 of the properties A and B. Programs and the like to be executed by the arithmetic operation unit 15 are also stored in the storage unit 14.

(4-1-2) Arithmetic Operation Unit 15

The arithmetic operation unit 15 is a component that executes various arithmetic operations on the basis of the information stored in the power management apparatus 10 or other information, and is configured from a CPU, ROM, RAM, and the like. The arithmetic operation unit 15 reads and executes the programs stored in the storage unit 14 described above. As a result, the arithmetic operation unit 15 functions as a power consumption amount prediction unit 15a, a power adjustment determination unit 15b, a facility device selection unit 15c, an adjustment request sending unit 15d, and an incentive information change unit 15e, as illustrated in FIG. 5.

The power consumption amount prediction unit 15a is a component that predicts the amount of power supply and the amount of power demand, and predicts the amount of power consumption after a predetermined period of time. The power consumption amount prediction unit 15a also determines whether or not there is a possibility of the amount of power demand after the predetermined period of time exceeding a predetermined amount of power supply.

When the power consumption amount prediction unit 15a determines that there is a possibility of the amount of power demand after the predetermined period of time exceeding the predetermined amount of power supply, the power adjustment determination unit 15b determines the adjustment amount, the adjustment timing, and the adjustment period necessary for suppressing power consumption.

The facility device selection unit 15c is a component that selects the facility devices 20 for which demand-response control is to be carried out on the basis of information of the facility devices 20 stored in the storage unit 14 and the information (the adjustment amount, the adjustment timing, and the adjustment period) determined by the power adjustment determination unit 15b as necessary for suppressing power consumption.

The adjustment request sending unit 15d is a component that sends the adjustment request to the control apparatus 30 selected by the facility device selection unit 15c. The adjustment request includes information such as the amount of power and the time frame for the adjustment. Note that, the amount of power to be adjusted may be predetermined depending on the specifics of the contract between the supplier and the consumer. In such cases, the sending of information related to the amount of power to be adjusted may be omitted.

The incentive information change unit 15e is a component that changes the information of the incentive to be granted to the user. An incentive is granted to the user of the facility devices 20 when the facility devices 20 carry out demand-response control for a predetermined period. The incentive may, for example, be granted as the product of the amount of power adjustment and an incentive unit price. The incentive unit price is a derivation element of the incentive, and may change during the demand-response control period. When the information of the incentive unit price or the like has changed, the incentive information change unit 15e sends information of the changed incentive unit price and the like to the control apparatus 30 via the communications unit 11.

(4-2) Facility Devices 20

The facility devices 20 are devices that operate under control conditions set by the control apparatus 30. The amount of power consumption across the entire energy consumption management system is adjusted due to the fact that these facility devices 20 operate under control conditions that satisfy adjustment requests from the power management apparatus 10.

Types of facility devices 20 include an air conditioner 20a, a light 20b, a ventilating fan 20c, and the like. The air conditioner 20a is a device for which power consumption during operation varies depending on differences in cooling modes/heating modes, differences in temperature settings, environmental variables such as outside temperature, and the like. The light 20b includes devices which can only be turned ON and OFF and for which power consumption while operating is constant, and also devices which are switchable between multiple levels of lighting and for which power consumption is different for each level. The ventilating fan 20c is a device which can only be turned ON and OFF and for which power consumption while operating is constant.

(4-3) Control Apparatus 30

Figure 7:
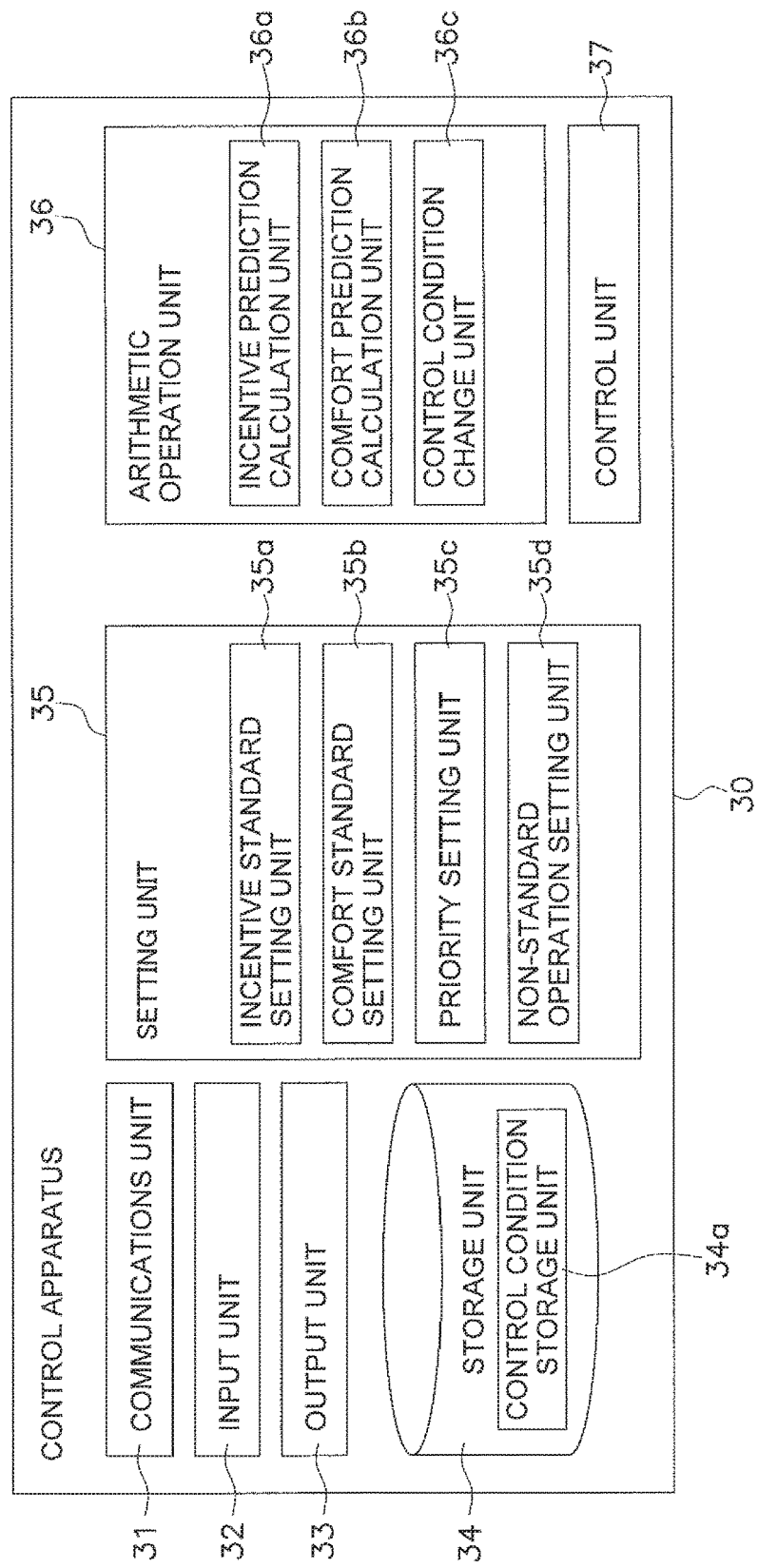
FIG. 7 is a schematic drawing illustrating a configuration of a control apparatus 30.

FIG. 7 is a schematic drawing illustrating a configuration of the control apparatus 30. The control apparatus 30 is a component that is used in the energy consumption management system, and controls the facility devices 20. The control apparatus 30 is provided with a communications unit 31, an input unit 32, an output unit 33, a storage unit 34, a setting unit 35, an arithmetic operation unit 36, and a control unit 37.

(4-3-1) Communications Unit 31, Input Unit 32, Output Unit 33, and Storage Unit 34

The communications unit 31 is a component that communicates with the power management apparatus 10, and is configured by a network interface and the like that enables the control apparatus 30 to be connected to the internet 101a.

The input unit 32 is a component whereby information is input to the control apparatus 30, and is configured from operation buttons, a touch screen covering the display of the output unit 33, and the like. Various commands such as changes to the settings and changes to the operation modes of the facility devices 20 can be input via the input unit 32.

The output unit 33 is a component on which information stored in the control apparatus 30 or other information is output, and is configured from a display or the like. For example, a screen showing the operational aspects of the facility devices 20 may be output to the display of the output unit 33. Specifically, ON/OFF states and operation modes (e.g. whether in cooling mode/heating mode for the air conditioner 20a) of the facility devices 20; information related to operational capacity when operating such as setting temperatures, lighting levels, ventilation levels, running time, and capacity utilization; and current power consumption may be displayed on the screen. Furthermore, the amount of the incentive resulting from the power usage amount that the facility devices 20 consume, the incentive unit price, and the like may be displayed on the display of the output unit 33.

Figure 8:
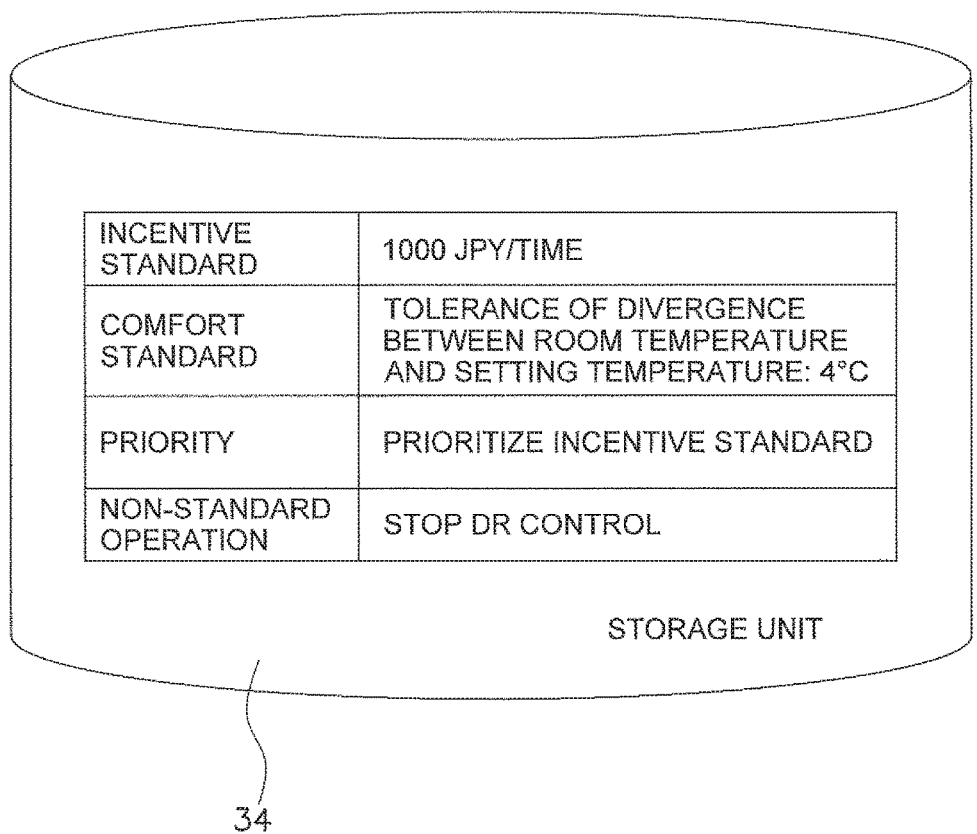
FIG. 8 is a schematic drawing illustrating a configuration of a storage unit 34.

The storage unit 34 is a component in which information that is input to the control apparatus 30 or other information is stored, and is configured from a hard disk or the like. Information received via the communications unit 31 and information input via the input unit 32, for example, are stored in the storage unit 34. Programs capable of being read and executed by the arithmetic operation unit 36 (described later) are also stored in the storage unit 34. Additionally, the hereinafter described "incentive standard", "comfort standard", "priority", "non-standard operation", and other information is also stored in the storage unit 34 (see FIG. 8). Furthermore, information of control conditions and power consumption corresponding to the type the facility device 20 is also stored in the storage unit 34. In the present specification, the term "control condition" refers to a condition with which the control apparatus 30 controls the facility device 20. For example, output information for controlling the air conditioner 20a so as to be a predetermined setting temperature or other information is stored in the storage unit 34 as a control condition. In an initial state, the control conditions are preset. Furthermore, the storage unit 34 includes a control condition storage unit 34a, and the changed control condition is stored in the control condition storage unit 34a in association with a control state of the time the control condition was changed. In the present specification, the term "control state" is information identifying the state of the facility device 20, and includes information such as elapsed time of the demand-response control, the setting temperature, and the incentive unit price.

(4-3-2) Setting Unit 35

The setting unit 35 is a component that sets information related to the control condition of the facility device 20. The information is set in the setting unit 35 via the input unit 32, and the set information is stored in the storage unit 34. Specifically, the setting unit 35 includes an incentive standard setting unit 35a, a comfort standard setting unit 35b, a priority setting unit 35c, and a non-standard operation setting unit 35d.

The incentive standard setting unit 35a is a component that sets a standard for the incentive, namely an incentive standard. In this case, the unit cost of the incentive is used as the incentive standard. However, the incentive standard is not limited to the unit cost and a variety of incentive standards may be used such as an earned amount of incentive, electricity charges, electricity unit rates, and the balance of electricity charges and incentives.

The comfort standard setting unit 35b is a component to set a comfort standard indicating the comfort of the space around the facility device 20. In this case, the divergence between the setting temperature of the air conditioner 20a and the room temperature is used as the comfort standard. However, the comfort standard is not limited thereto, and a variety of comfort standards may be used such as room temperatures, changes in the room temperature from before control, lighting intensities, ventilation $CO_2$ concentrations, and temperatures of water supplied from water heater.

The priority setting unit 35c is a component that sets a priority indicating which of the incentive standard and the comfort standard is to be prioritized.

The non-standard operation setting unit 35d is a component that sets a non-standard operation to be carried out on the facility device 20 when neither the incentive prediction nor the comfort prediction (described below) is within the range of the standards. For example, operations such as "stop the DR control," "maintain the control condition," and "refer to the priority" may be set by the non-standard operation setting unit 35d as the non-standard operation.

(4-3-3) Arithmetic Operation Unit 36

The arithmetic operation unit 36 is a component that executes various arithmetic operations on the basis of the information stored in the control apparatus 30 or other information, and is configured from a CPU, ROM, and RAM, for example. The arithmetic operation unit 36 reads and executes the programs stored in the storage unit 34 described above and, as a result, has the functions of an incentive prediction calculation unit 36a, a comfort prediction calculation unit 36b, and a control condition change unit 36c as illustrated in FIG. 7.

The incentive prediction calculation unit 36a is a component that calculates an incentive prediction indicating the amount of incentive earned as a result of the DR control. When there is variation in the derivation element of the incentive during the DR control period, the incentive prediction calculation unit 36a changes the preset control condition of the facility device 20 and calculates the incentive prediction.

Figure 9:
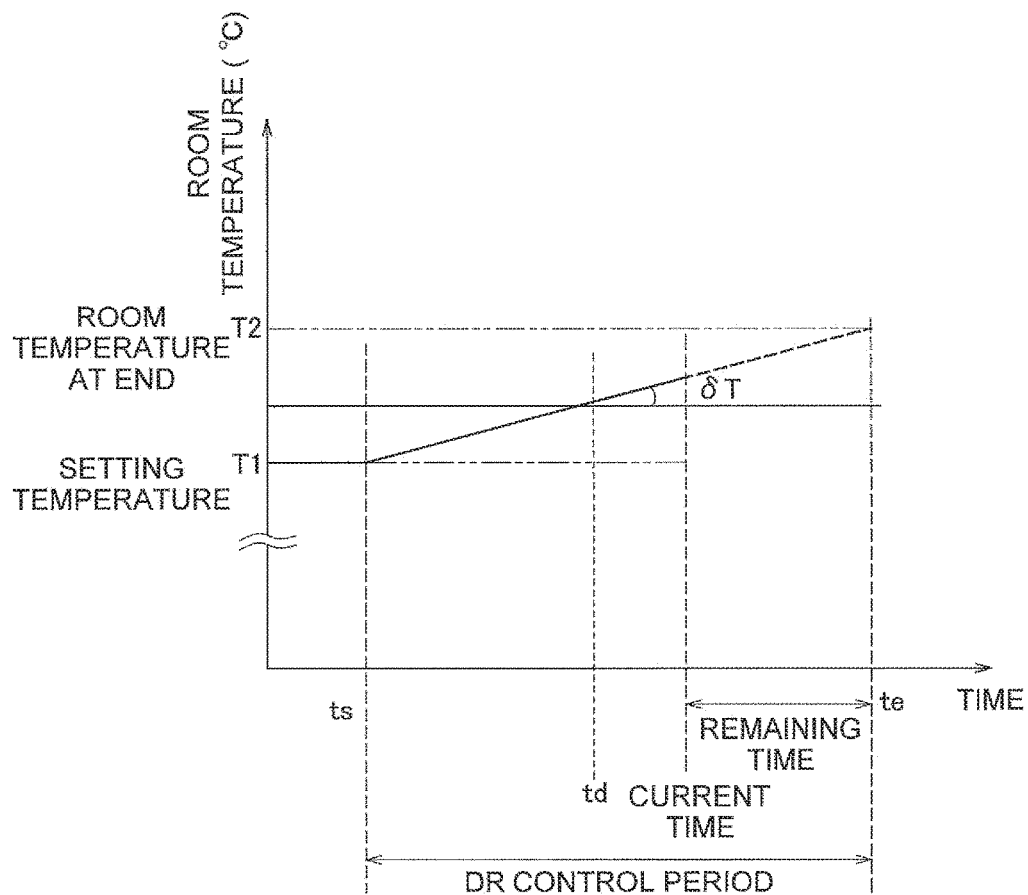
FIG. 9 is a diagram explaining a method of calculating a comfort prediction.

The comfort prediction calculation unit 36b is a component that calculates a comfort prediction indicating a prediction of the comfort of the space around the facility device 20. Specifically, when there is variation in the derivation element of the incentive during the DR control period, the comfort prediction calculation unit 36b changes the preset control condition of the facility device 20 and calculates the comfort prediction. To calculate the comfort prediction, a method can be used in which the slope δT of the transition of an index value of comfort after a predetermined period of time has elapsed is calculated by least squares method, and the index value at the end point is calculated under the assumption that the index value transitions along an equivalent slope. Specifically, when the facility device 20 is the air conditioner 20a, the index value of comfort is the room temperature. In this case, the room temperature transitions as depicted in FIG. 9. That is, for the period up to a start timing ts of the DR control, the air conditioner 20a performs cooling operations at a setting temperature T1 (corresponds to the preset control condition). As such, for the period up to a timing te, the outside temperature is higher than the setting temperature. Then, the DR control starts at the timing ts and the output of the air conditioner 20a is reduced. Next, when the control condition of the air conditioner 20a (the facility device) is changed at a timing td after the predetermined period of time has elapsed, the comfort prediction calculation unit 36b calculates the slope δT from the transition of the room temperature. Then, assuming that the room temperature will rise at an equivalent slope, the comfort prediction calculation unit 36b predicts the room temperature at an end timing te of the DR control period by multiplying the slope δT by the remaining time (δT×(remaining time)). To predict the slope δT, for example, a method can be used in which an approximate line is calculated using the least squares method. However, another method may be used in which the slope δT is found from the historical data of past control conditions that the control apparatus 30 has applied when controlling the air conditioner 20a (the facility device).

The control condition change unit 36c is a component that changes the control condition of the facility device 20. The control condition change unit 36c changes the preset control condition of the facility device 20 when there is variation in the derivation element of the incentive during the DR control period. The control condition change unit 36c determines the control condition of the facility device 20 on the basis of the incentive prediction, the incentive standard, the comfort prediction, the comfort standard, and the priority. The method for determining the control condition is described later. Note that, when the control condition has been changed, the control condition change unit 36c stores the changed control condition in the control condition storage unit 34a in association with the control state of the time the control condition was changed.

The control unit 37 is a component which controls the facility device 20 on the basis of the control condition changed by the control condition change unit 36c, after the variation has occurred in the derivation element of the incentive.

(5) Operations of the Control Apparatus 30

Figure 10:
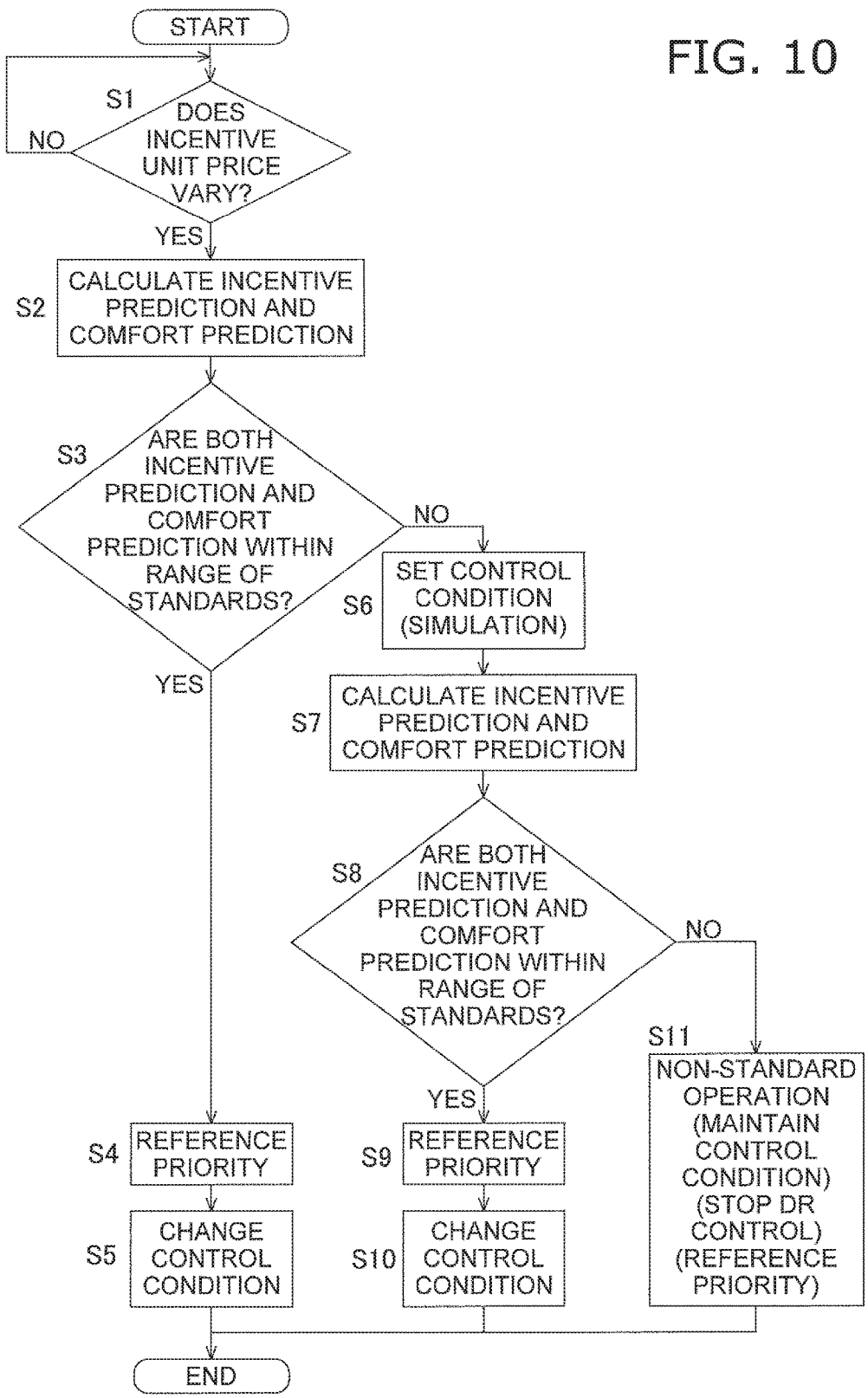
FIG. 10 is a flowchart explaining the operations of the control apparatus 30.

FIG. 10 is a flowchart explaining the operations of the control apparatus 30.

First, the communications unit 31 of the control apparatus 30 receives information of the incentive unit price or the like from the power management apparatus 10 (S1). When the information of the incentive unit price varies during the DR control period, the incentive prediction calculation unit 36a and the comfort prediction calculation unit 36b of the control apparatus 30 calculate the incentive prediction and the comfort prediction (S2).

Figure 11:
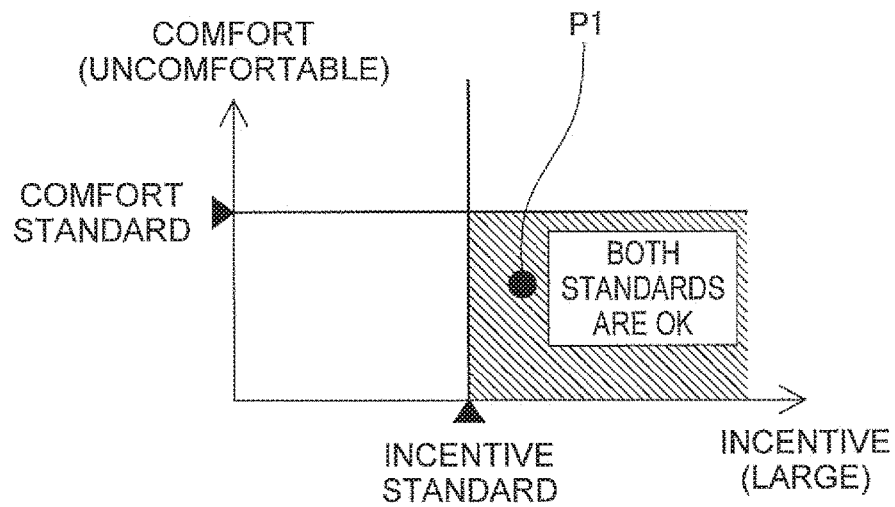
FIG. 11 is a drawing illustrating an incentive prediction and a comfort prediction.
Figure 12:
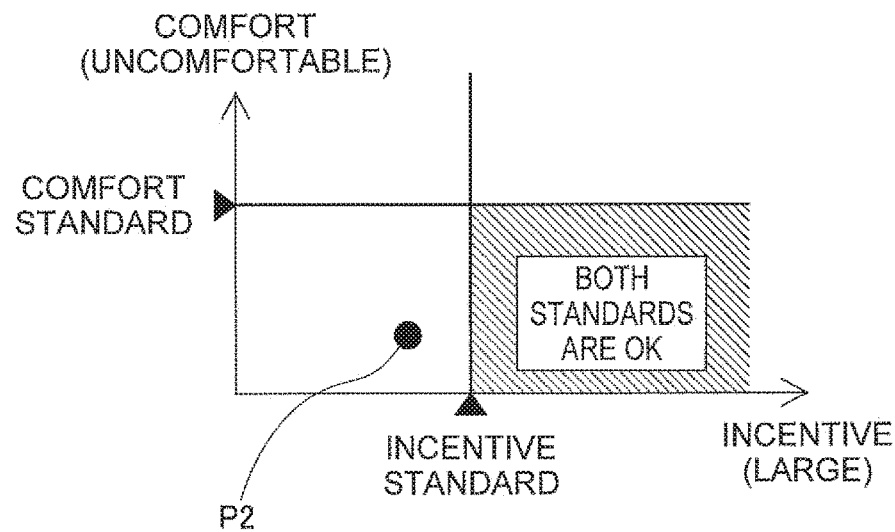
FIG. 12 is a drawing illustrating an incentive prediction and a comfort prediction.
Figure 13:
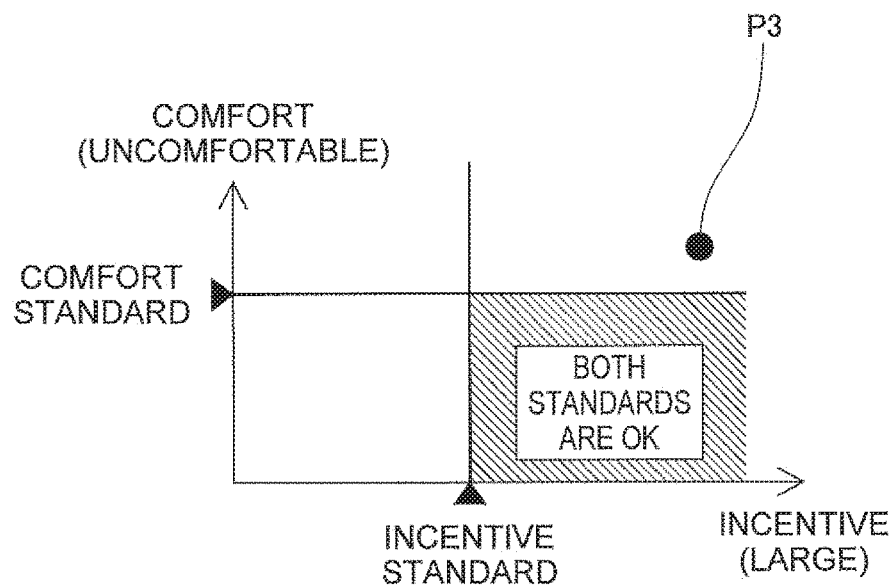
FIG. 13 is a drawing illustrating an incentive prediction and a comfort prediction.
Figure 14:
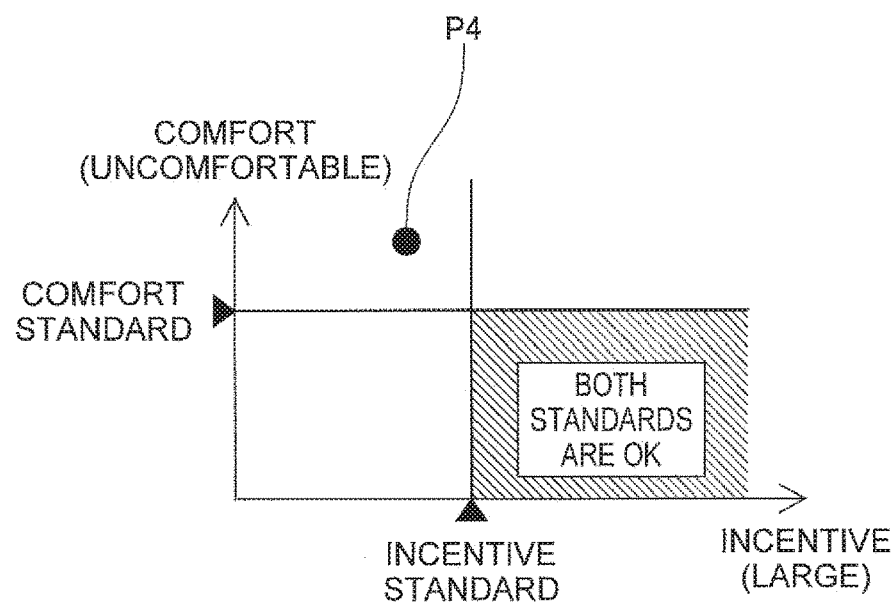
FIG. 14 is a drawing illustrating an incentive prediction and a comfort prediction.

Next, the control condition change unit 36c of the control apparatus 30 determines whether or not the incentive prediction is within the range of the incentive standard and also whether or not the comfort prediction is within the range of the comfort standard (S3). The point P1 in FIG. 11 represents a situation in which the incentive prediction is within the range of the incentive standard and also the comfort prediction is within the range of the comfort standard. The size of the incentive is shown on the horizontal axis in FIG. 11. Thus, the incentive prediction being within the range of the incentive standard means that the incentive is larger than the incentive standard. Tolerance of the comfort is shown on the vertical axis in FIG. 11. As such, the comfort prediction being within the range of the comfort standard means that the comfort prediction is smaller than the comfort standard. The point P2 in FIG. 12 represents a situation in which the incentive prediction is not within the range of the incentive standard but the comfort prediction is within the range of the comfort standard. The point P3 in FIG. 13 represents a situation in which the incentive prediction is within the range of the incentive standard but the comfort prediction is not within the range of the comfort standard. The point P4 in FIG. 14 represents a situation in which the incentive prediction is not within the range of the incentive standard and the comfort prediction is not within the range of the comfort standard.

Figure 15:
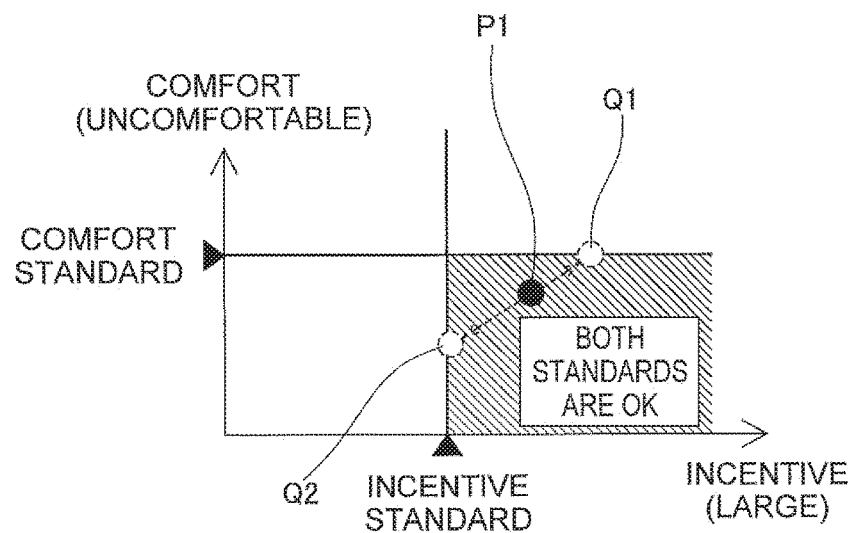
FIG. 15 is a drawing explaining the operations of a control condition change unit 36c.

When the control condition change unit 36c of the control apparatus 30 has determined that the incentive prediction is within the range of the incentive standard and also the comfort prediction is within the range of the comfort standard, the control condition change unit 36c references the priority stored in the storage unit 34 and changes the control condition (S3—Yes, S4, and S5). When the priority is set as "prioritize the incentive standard," the control condition change unit 36c changes the preset control condition and sets a new control condition that results in a transition from the state of P1 to the state of Q1 depicted in FIG. 15. That is, the control condition change unit 36c changes the control condition such that the operating state of the facility device 20 transitions to the state of Q1, which is an intersection of the incentive prediction and the comfort standard. In a case where the priority is set to "prioritize the comfort standard," the control condition change unit 36c sets a new control condition that results in a transition from the state of P1 to the state of Q2 depicted in FIG. 15. That is, the control condition change unit 36c changes the control condition such that the operating state of the facility device 20 transitions to the state of Q2, which is an intersection of the incentive standard and the comfort prediction.

Figure 16:
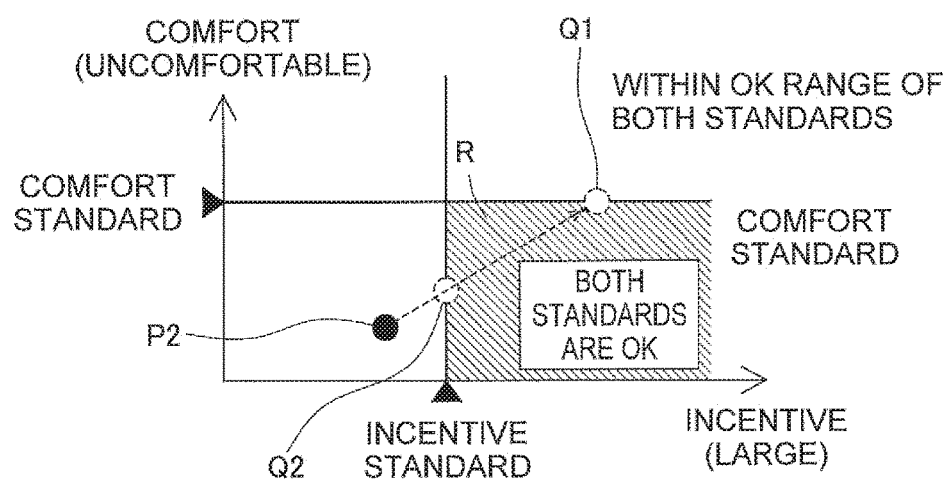
FIG. 16 is a drawing explaining the operations of a control condition change unit 36c.

When the control condition change unit 36c of the control apparatus 30 has determined in step S3 that the incentive prediction is not within the range of the incentive standard or that the comfort prediction is not within the range of the comfort standard (in this case, when determined to be the state of the point P2 in FIG. 12), the control condition change unit 36c executes a simulation in which the preset control condition is changed and the incentive prediction and the comfort prediction are calculated (S3—No, S6, and S7). Next, the control condition change unit 36c determines again whether or not the incentive prediction is within the range of the incentive standard and also whether or not the newly calculated comfort prediction is within the range of the comfort standard (S8). Specifically, as illustrated in FIG. 16, the control condition change unit 36c determines whether or not it is possible to transition from a state in which only one of the incentive prediction and the comfort prediction satisfies the respective standard (the state of P2) to a state in which the incentive prediction and the comfort prediction both satisfy the respective standard (the state within the shaded region R).

When the control condition change unit 36c of the control apparatus 30 has determined as a result of the above simulation that the incentive prediction is within the range of the incentive standard and also the comfort prediction is within the range of the comfort standard, the control condition change unit 36c references the stored priority and changes the control condition (S8—Yes, S9, and S10). When the priority is set as "prioritize the incentive standard," the control condition change unit 36c changes the preset control condition and sets a new control condition, so as to transition from the state of P2 to the state of Q1 depicted in FIG. 16. When the priority is set as "prioritize the comfort standard," the control condition change unit 36c sets a new control condition so as to transition from the state of P2 to the state of Q2 depicted in FIG. 16.

Figure 17:
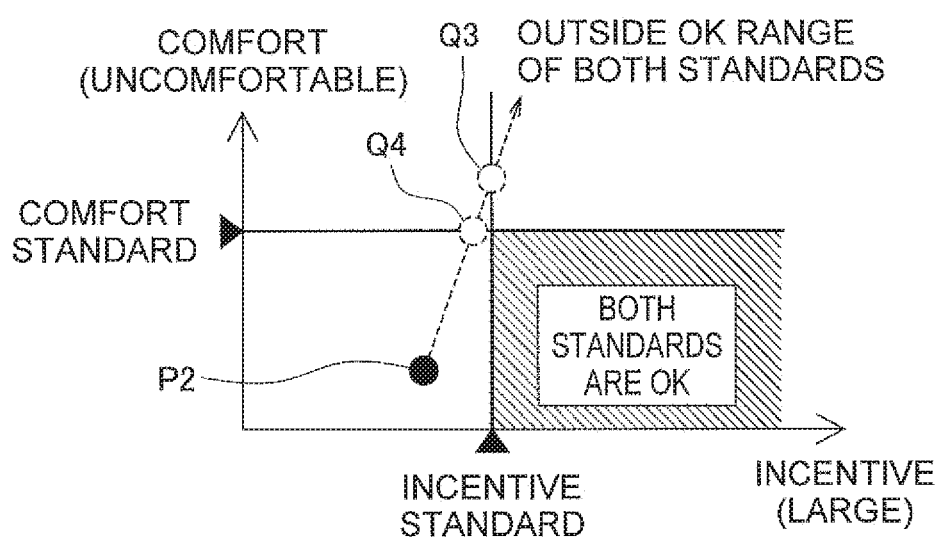
FIG. 17 is a drawing explaining the operations of a control condition change unit 36c.

When the control condition change unit 36c of the control apparatus 30 has determined in step S8 that the incentive prediction is not within the range of the incentive standard and also that the comfort prediction is not within the range of the comfort standard, a preset ending operation is executed (S8—No and S11). That is, as illustrated in FIG. 17, when the control condition change unit 36c has determined that changing the control condition will lead to a change from the state of the point P2 to the states of the points Q3 or Q4, the control condition change unit 36c executes the non-standard operation. If the non-standard operation is set as "stop the DR control," the control condition change unit 36c stops the DR control. If the non-standard operation is set as "maintain the control condition," the control condition change unit 36c maintains the preset control condition. If the non-standard operation is set as "reference the priority," the control condition change unit 36c changes the preset control condition and sets a new control condition on the basis of the priority. In this case, the control condition change unit 36c sets a new control condition so as to transition from the state of P2 to, for example, the state of Q3 or Q4 depicted in FIG. 17.

Figure 18A:
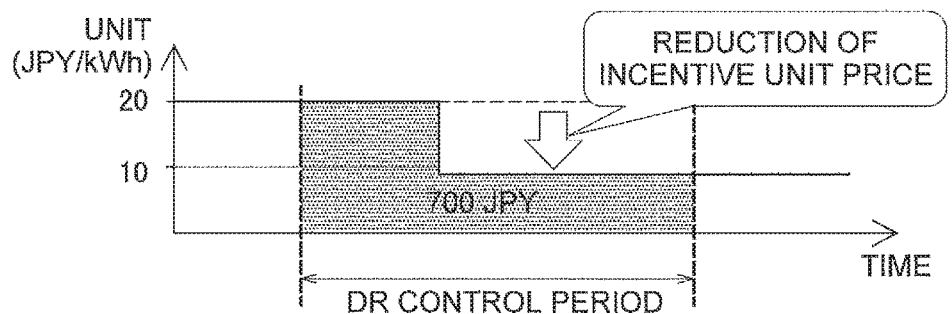
FIGS. 18A and 18B are drawings explaining the operations of the control apparatus 30.
Figure 18A:
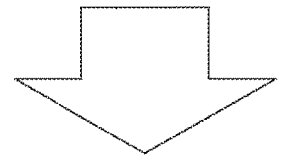
Figure 18B:
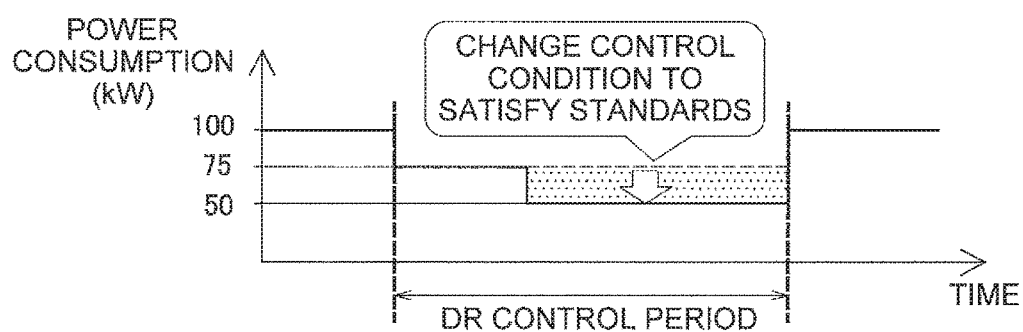

The control apparatus 30 according to the present embodiment operates as described above. As such, as illustrated in FIGS. 18A and 18B, even when the incentive unit price is decreased during the DR control period (FIG. 18A), the control apparatus 30 automatically changes the control condition so as to satisfy the incentive standard and the comfort standard set by the user (FIG. 18B).

(6) Features (6-1)

As described above, energy consumption management systems grant an incentive to a user of the facility device 20 when the facility device 20 carries out an adjustment of the amount of energy consumption for a predetermined adjustment period in compliance with an adjustment request.

The control apparatus 30 according to one embodiment of the present invention is used in such a energy consumption management system. The control apparatus 30 controls the facility device 20. The control apparatus 30 is provided with the control condition change unit 36c and the control unit 37. The control condition change unit 36c changes the preset control condition of the facility device 20 when there is variation in the derivation element of the incentive, such as the incentive unit price, during the adjustment period. After the variation has occurred in the derivation element of the incentive, the control unit 37 controls the facility device 20 on the basis of the control condition changed by the control condition change unit 36c.

Thus, when there is variation in the derivation element of the incentive during the adjustment period of the amount of energy consumption, the control apparatus 30 changes the preset control condition of the facility device 20 and controls the facility device 20 on the basis of the changed control condition. As a result of this configuration, the user can earn an incentive as expected, even when there is variation in the derivation element of the incentive.

(6-2)

The control apparatus 30 is further provided with the incentive standard setting unit 35a and the incentive prediction calculation unit 36a. The incentive standard setting unit 35a receives the setting of a standard of the incentive, namely the incentive standard. When there is variation in the derivation element of the incentive during the adjustment period, the incentive prediction calculation unit 36a changes the preset control condition of the facility device 20 and calculates an incentive prediction indicating a prediction of the incentive. The control condition change unit 36c determines the control condition of the facility device 20 on the basis of the incentive prediction and the incentive standard.

Thus, the control apparatus 30 determines the control condition of the facility device on the basis of the incentive prediction and the incentive standard. As a result of this configuration, the user can earn an incentive satisfying the incentive standard even when there is variation in the derivation element of the incentive.

(6-3)

The control apparatus 30 is further provided with the comfort standard setting unit 35b and the comfort prediction calculation unit 36b. The comfort standard setting unit 35b receives the setting of a comfort standard indicating the comfort of the space around the facility device 20. When there is variation in the derivation element of the incentive during the adjustment period, the comfort prediction calculation unit 36b changes the preset control condition of the facility device 20 and calculates a comfort prediction indicating the comfort. The control condition change unit 36c determines the control condition of the facility device 20 on the basis of the comfort prediction and the comfort standard.

Thus, the control apparatus 30 determines the control condition of the facility device 20 on the basis of the comfort prediction and the preset comfort standard. As a result of this configuration, the user can earn an incentive as expected without decreasing the comfort.

(6-4)

The control apparatus 30 is further provided with the priority setting unit 35c. The priority setting unit 35c receives the setting of the priority indicating which of the incentive standard and the comfort standard is to be prioritized. The control condition change unit 36*c* determines the control condition of the facility device 20 on the basis of the incentive prediction, the incentive standard, the comfort prediction, the comfort standard, and the priority.

Thus, the control apparatus 30 receives the setting of the priority indicating which of the incentive standard and the comfort standard is to be prioritized. As a result of this configuration, the control apparatus 30 can control the facility device in accordance with user preferences.

(7) Modification Examples

(7-1) Modification Example 1A

Figure 19A:
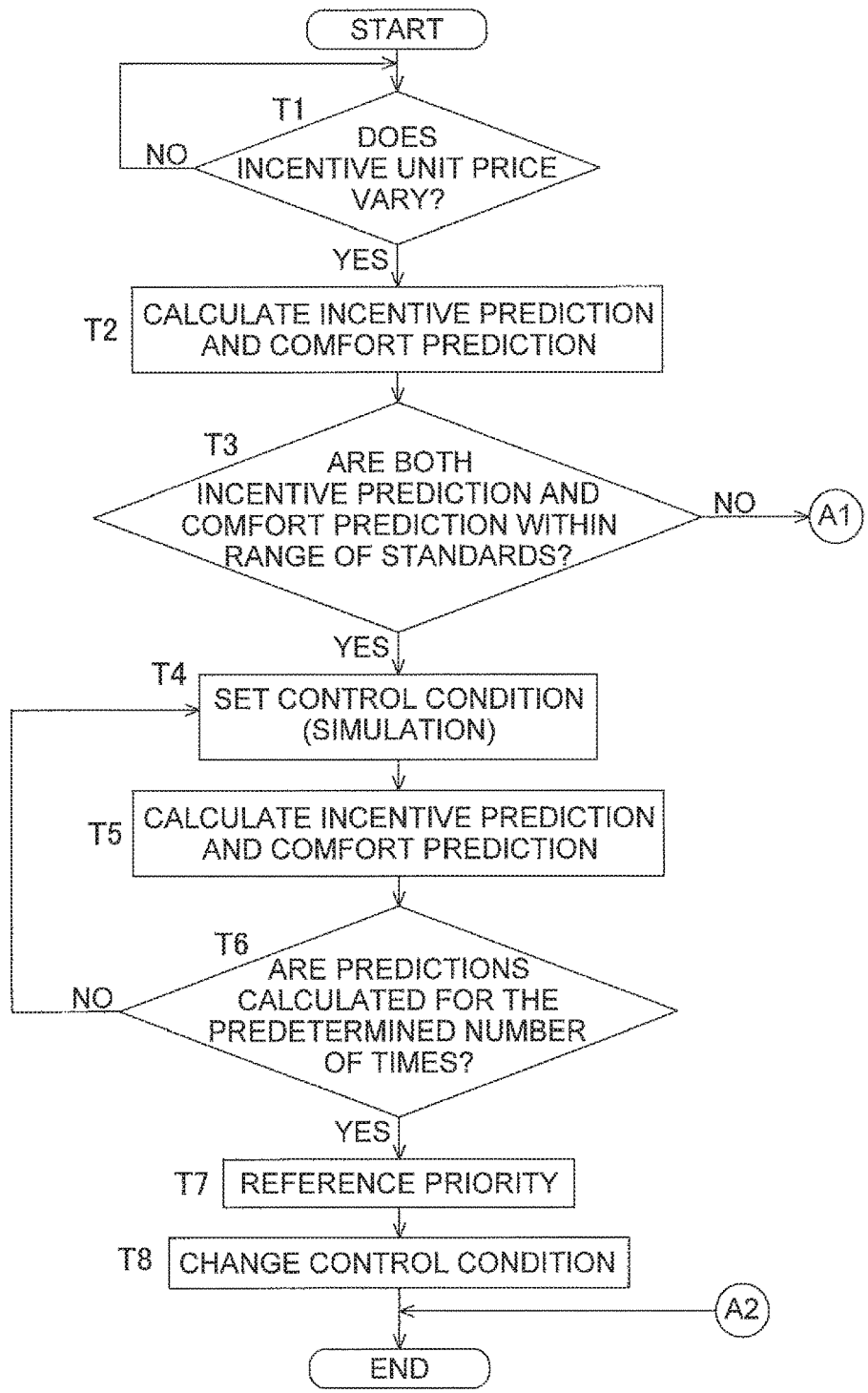
FIG. 19A is a flowchart explaining the operations of Modification Example 1A of the control apparatus 30.
Figure 19B:
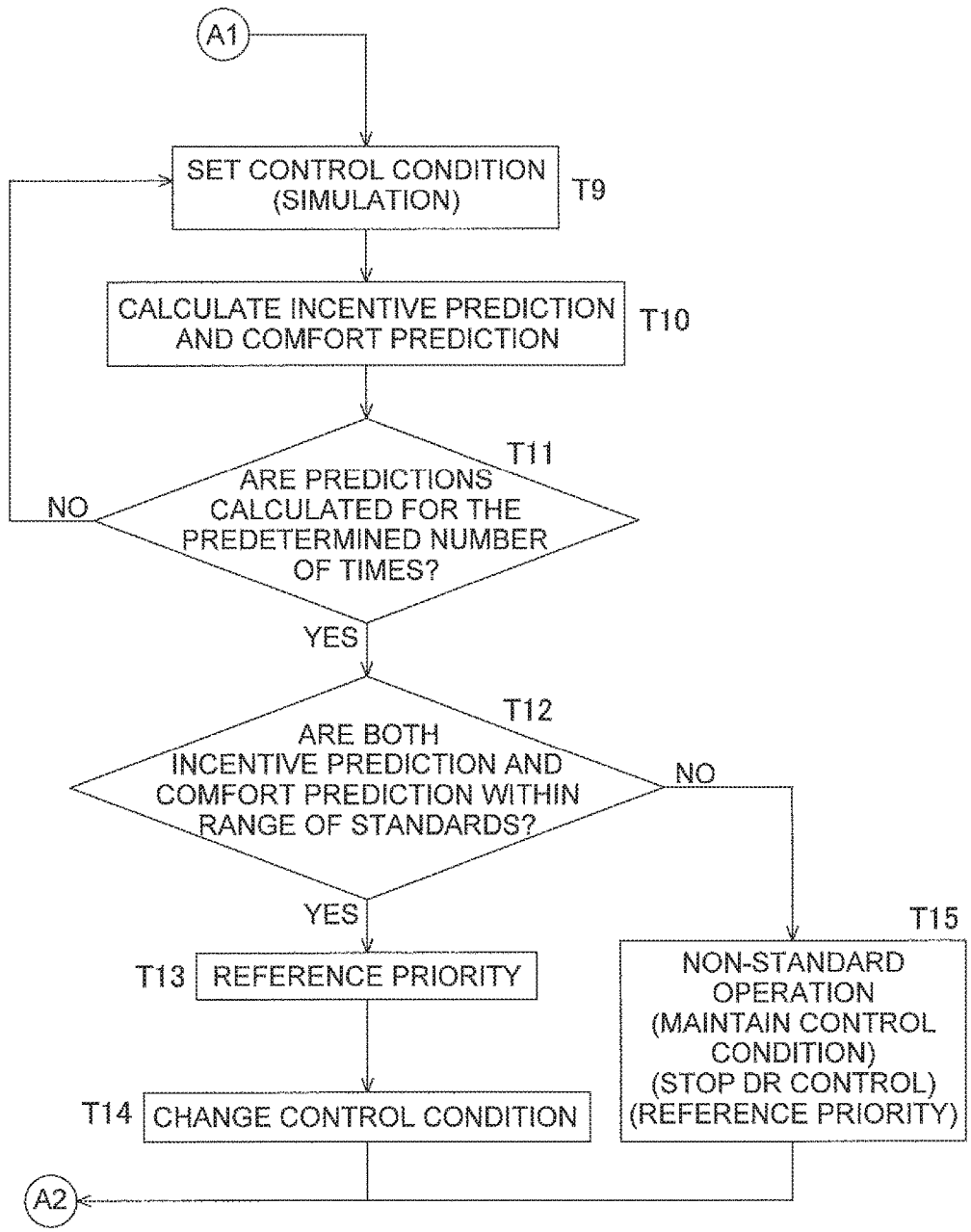
FIG. 19B is a flowchart explaining the operations of Modification Example 1A of the control apparatus 30.

When determining the control condition, the optimal control condition may be found after the control condition change unit 36*c* sequentially changes the setting of the control condition and sequentially calculates the incentive prediction and the comfort prediction. FIGS. 19A and 19B are flowcharts explaining operations of Modification Example 1A of the control apparatus 30.

The communications unit 31 of the control apparatus 30 carries out the same operations as in steps S1 to S3. That is, the communications unit 31 receives the information of the incentive unit price or the like and determines whether or not the incentive prediction and the comfort prediction are within the range of each respective standard (steps T1 to T3).

In step T3, the control condition change unit 36*c* of the control apparatus 30 carries out a simulation for calculating the incentive prediction and the comfort prediction is carried out for a predetermined number of times, even when the control condition change unit 36*c* has determined that the incentive prediction is within the range of the incentive standard and also the comfort prediction is within the range of the comfort standard (T3—Yes, T4 to 6). Then, the control condition change unit 36*c* changes the control condition on the basis of the plurality of incentive predictions and comfort predictions calculated in step T6, the incentive standard, the comfort standard, and the priority (T7 and T8).

When the control condition change unit 36*c* of the control apparatus 30 has determined in step T3 that the incentive prediction is not within the range of the incentive standard or that the comfort prediction is not within the range of the comfort standard, the control condition change unit 36*c* executes a simulation for calculating the incentive prediction and the comfort prediction a predetermined number of times (T3—No, T9 to T11). Next, the control condition change unit 36*c* determines again whether or not the incentive prediction is within the range of the incentive standard and also whether or not the newly calculated comfort prediction is within the range of the comfort standard (T12). Thereafter, the same operations as in steps S9 to 11 described above are carried out (steps T13 to T15).

As described above, with the control apparatus 30 according to Modification Example 1A, the incentive prediction calculation unit 36*a* sequentially changes the preset control condition of the facility device 20 to a plurality of control conditions and calculates a plurality of incentive predictions when there is variation in the derivation element of the incentive. Additionally, with the control apparatus 30, the comfort prediction calculation unit 36*b* sequentially changes the preset control condition of the facility device 20 to a plurality of control conditions and calculates a plurality of comfort predictions when there is variation in the derivation element of the incentive. Moreover, the control condition change unit 36*c* determines the control condition of the facility device 20 on the basis of the plurality of incentive predictions, the incentive standard, the plurality of comfort predictions, and the comfort standard. As such, the control apparatus 30 can control the facility device 20 such that a more preferable incentive and comfort are obtained.

(7-2) Modification Example 1B

Figure 20A:
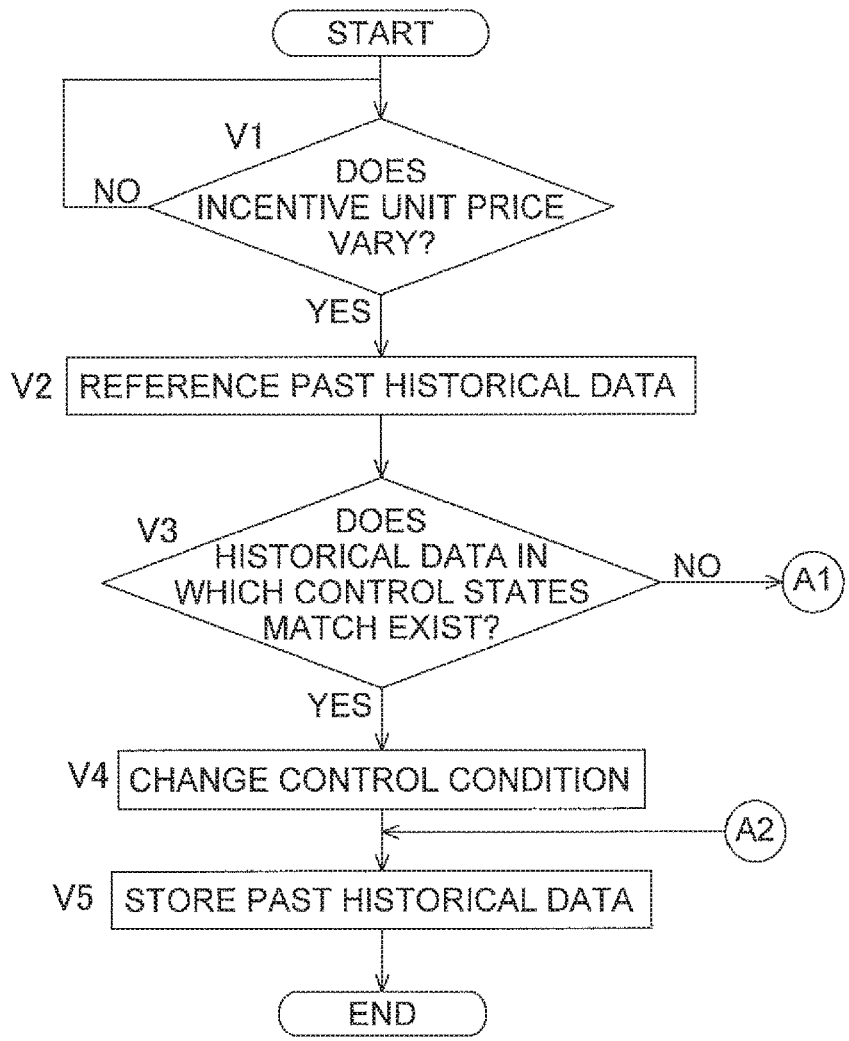
FIG. 20A is a flowchart explaining the operations of Modification Example 1B of the control apparatus 30.
Figure 20B:
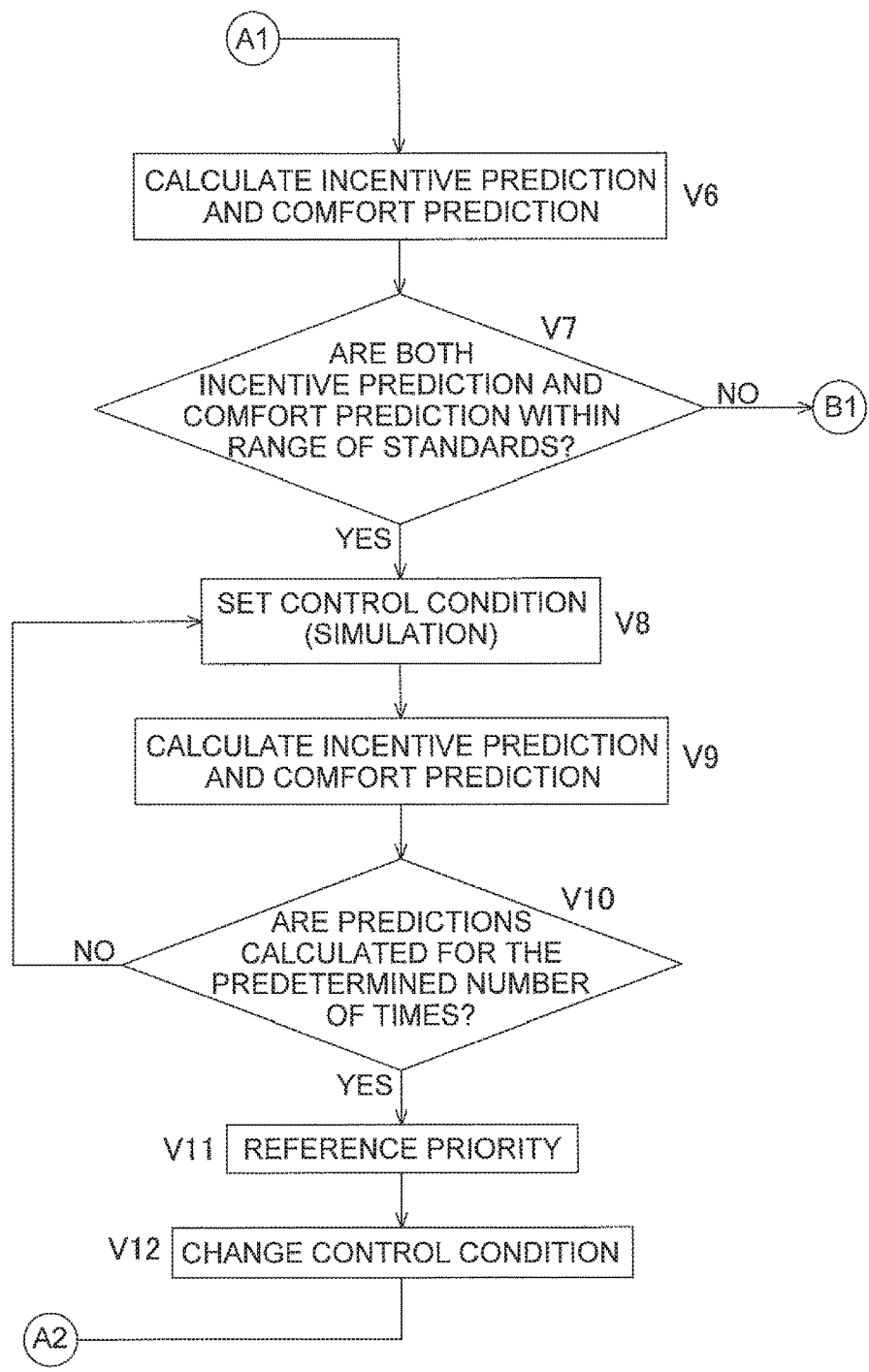
FIG. 20B is a flowchart explaining the operations of Modification Example 1B of the control apparatus 30.
Figure 20C:
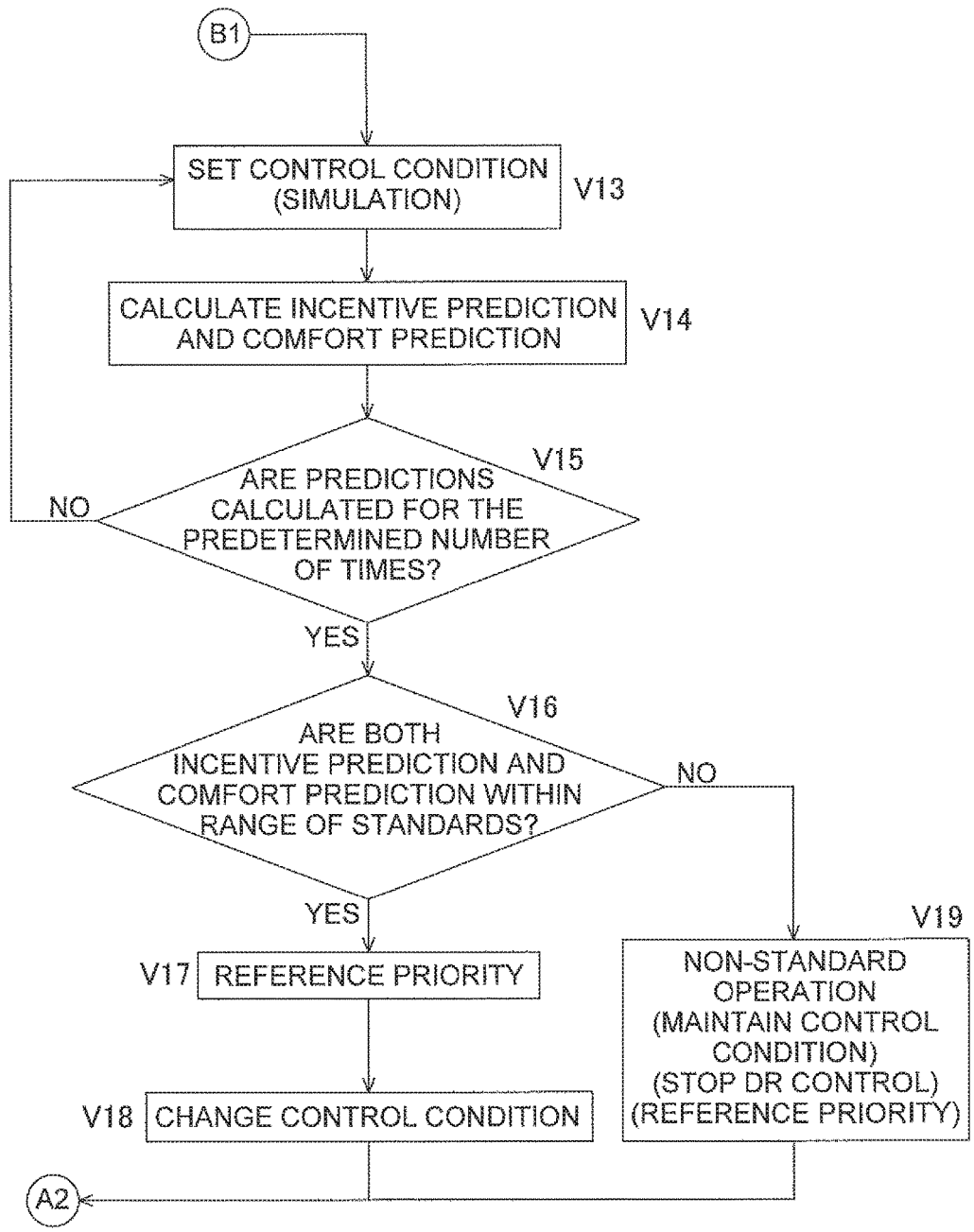
FIG. 20C is a flowchart explaining the operations of Modification Example 1B of the control apparatus 30.

When determining the control condition, the optimal control condition may be found from historical data of past control conditions stored in the control condition storage unit 34*a*. FIGS. 20A to C are flowcharts explaining the operations of Modification Example 1B of the control apparatus 30.

First, the communications unit 31 of the control apparatus 30 receives information of the incentive unit price from the power management apparatus 10 (V1). Next, the control condition change unit 36*c* of the control apparatus 30 references the historical data of past control conditions in the control condition storage unit 34*a*, and determines whether or not a control condition for which the control states match exists in the data (V2 and V3). When data in which the control states match exists in the control condition storage unit 34*a*, the control condition change unit 36*c* reads the data of the control condition from the control condition storage unit 34*a*, and changes the control condition of the facility device 20 (V3—Yes and V4). The changed control condition is newly stored in the control condition storage unit 34*a* (V5).

When data in which the control states match does not exist in the control condition storage unit 34*a*, steps T1 to T16 of Modification Example 1A described above are executed (V3—No, V6 to 19). As a result, the control condition is changed. Then, the changed control condition is stored in the control condition storage unit 34*a* (V5).

As described above, with the control apparatus 30 according to Modification Example 1B, the control condition is stored in the control condition storage unit 34*a* in association with the control state of the time the derivation element of the incentive varied. When there is variation in the derivation element of the incentive, the control condition change unit 36*c* reads the control condition from the control condition storage unit 34*a* on the basis of the control state. As such, the control apparatus 30 can quickly determine the optimal control condition from the historical data of past control conditions.

(7-3) Modification Example 1C

Figure 21:
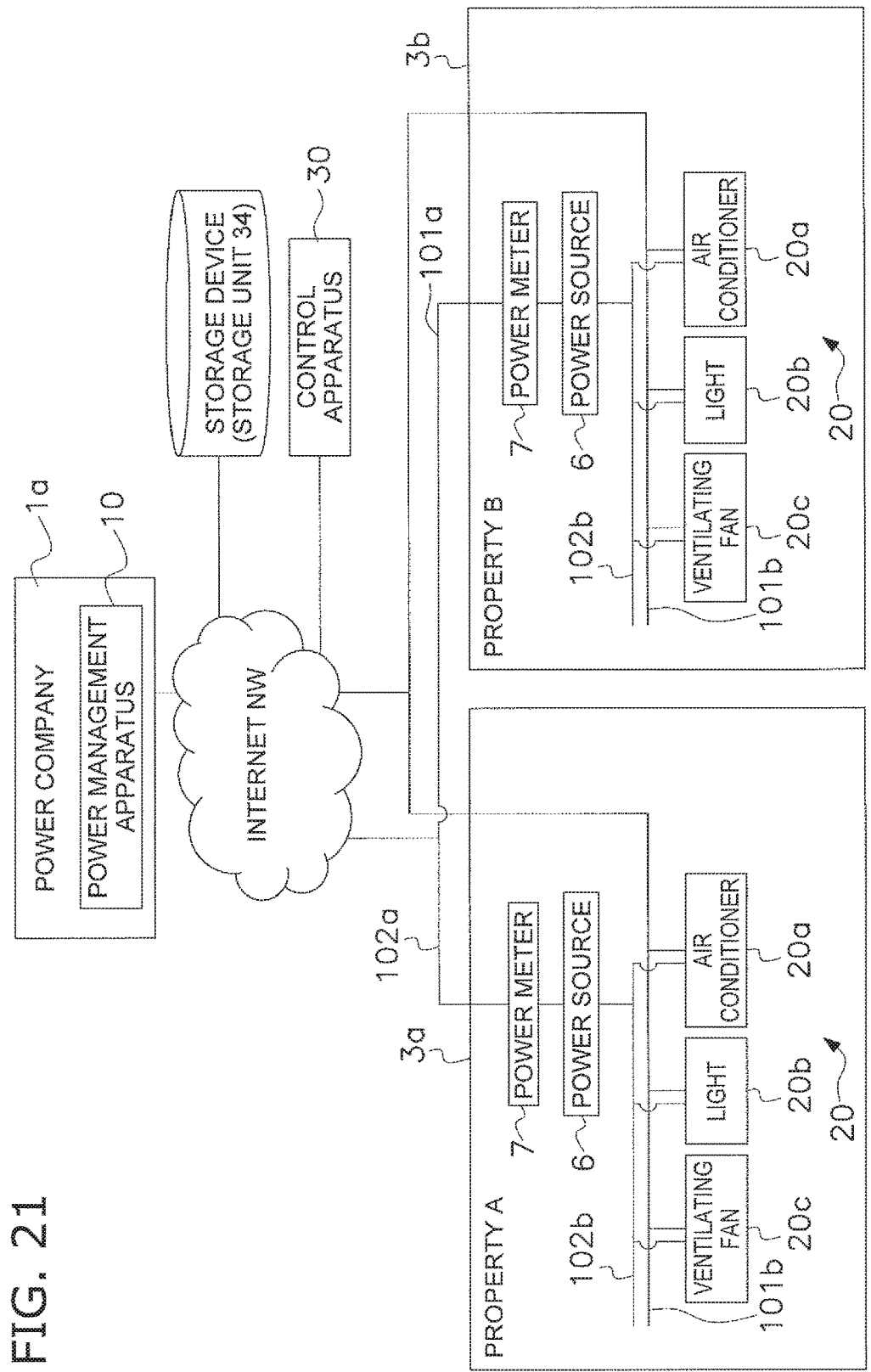
FIG. 21 is a schematic drawing illustrating a configuration of Modification Example 1C of the control apparatus 30.

The control apparatus 30 may be connected to the facility devices 20 via a network NW. Additionally, the storage unit 34 and the arithmetic operation unit 36 of the control apparatus 30 may be independent devices. For example, as illustrated in FIG. 21, a cloud configuration is possible in which the devices are connected to each other via the internet or the like.

In this case, the control apparatus 30 is connected to the facility devices 20 via the network and, as a result, the control apparatus 30 can control facility devices 20 at any location.

(7-4) Modification Example 1D

Figure 22:
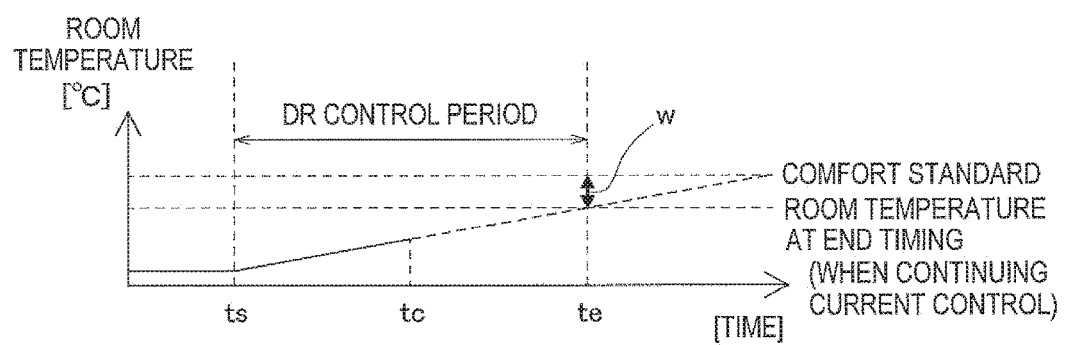
FIG. 22 is a diagram explaining a "state where margin exists."

In the present embodiment, the comfort prediction calculation unit 36*b* calculates the comfort prediction at the end timing te of the DR control but, in some cases, the comfort does not decline to the degree initially predicted. For example, as depicted in FIG. 22, a shift W may occur in the predicted value of the room temperature at the end timing te, even when the control condition of the air conditioner has been set such that the temperature of the comfort standard is reached at the end timing te of the DR control. In this case, a state where margin exists with respect to the tolerable comfort standard of the user is attained at the end timing te of the DR control.

In addition to the configurations of the control apparatus 30 described above, the control apparatus 30 according to Modification Example 1D is further provided with an additional control processing unit 36d so that optimal power adjustment can be carried out even when margin exists with respect to the comfort standard.

Figure 23:
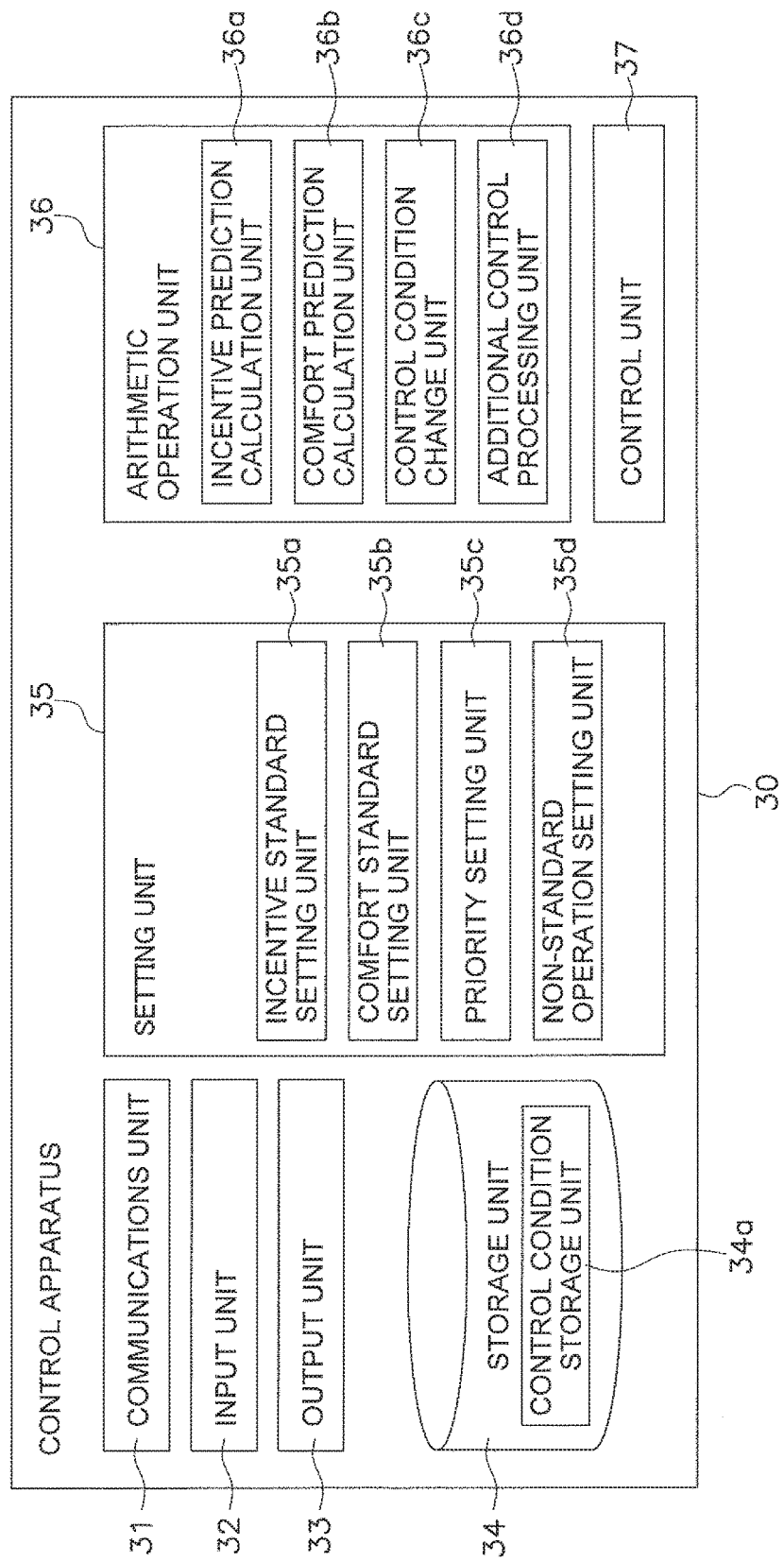
FIG. 23 is a schematic drawing illustrating a configuration of a control apparatus 30D according to Modification Example 1D.

FIG. 23 is a schematic drawing illustrating a configuration of the control apparatus 30D according to Modification Example 1D. In the following, constituents identical to those described previously are assigned substantially the same reference signs and redundant description thereof is omitted.

Figure 24:
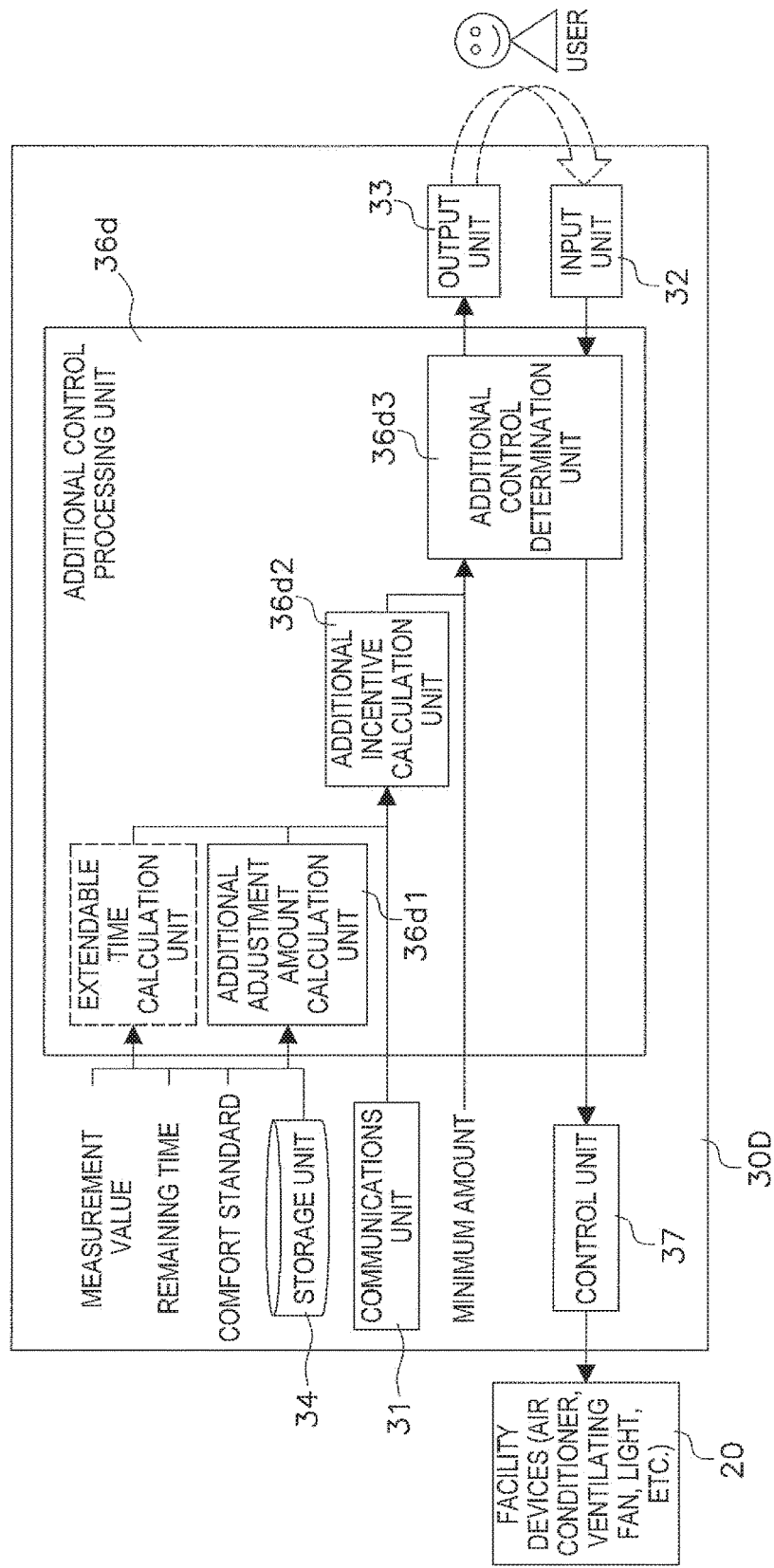
FIG. 24 is a schematic drawing illustrating a configuration of an additional control processing unit 36d of Modification Example 1D.

As depicted in FIG. 24, the additional control processing unit 36d is provided with an additional adjustment amount calculation unit 36d1, an additional incentive calculation unit 36d2, and an additional control determination unit 36d3.

The additional adjustment amount calculation unit 36d1 is a component which, upon receipt of a calculation start trigger, calculates additional control specifics and an additional adjustment amount. The calculation start trigger is generated when, for example, the remaining time of the DR control reaches a predetermined amount of time (remaining time x minutes); when a predetermined amount of time has elapsed from the start timing of the DR control (x minutes from start of adjustment); when there arises a shift between the measurement temperature of the air conditioner and the temperature of the comfort standard; when the measurement temperature of the air conditioner reaches a predetermined value (current temperature of y° C.); or when a user inputs a calculation start request.

The additional adjustment amount calculation unit 36d1 carries out the following operations. First, the additional adjustment amount calculation unit 36d1 calculates a maximum rate of change on the basis of the comfort standard, a measurement value of a sensor, and the remaining time of the DR control period. For example, when the facility device 20 is an air conditioner, the additional adjustment amount calculation unit 36d1 finds a margin temperature from the temperature corresponding to the comfort standard and the current temperature measured by a thermometer. Next, the additional adjustment amount calculation unit 36d1 calculates the maximum rate of change on the basis of the margin temperature and the remaining time, as shown in Equation (1) below.

Max. Rate of Change [° C./5 min.]=Margin Temp. [° C.]÷Remaining Time [min.]    (1)

Margin Temp.=Temp. of Comfort Standard−Current Temp.

Figure 25:
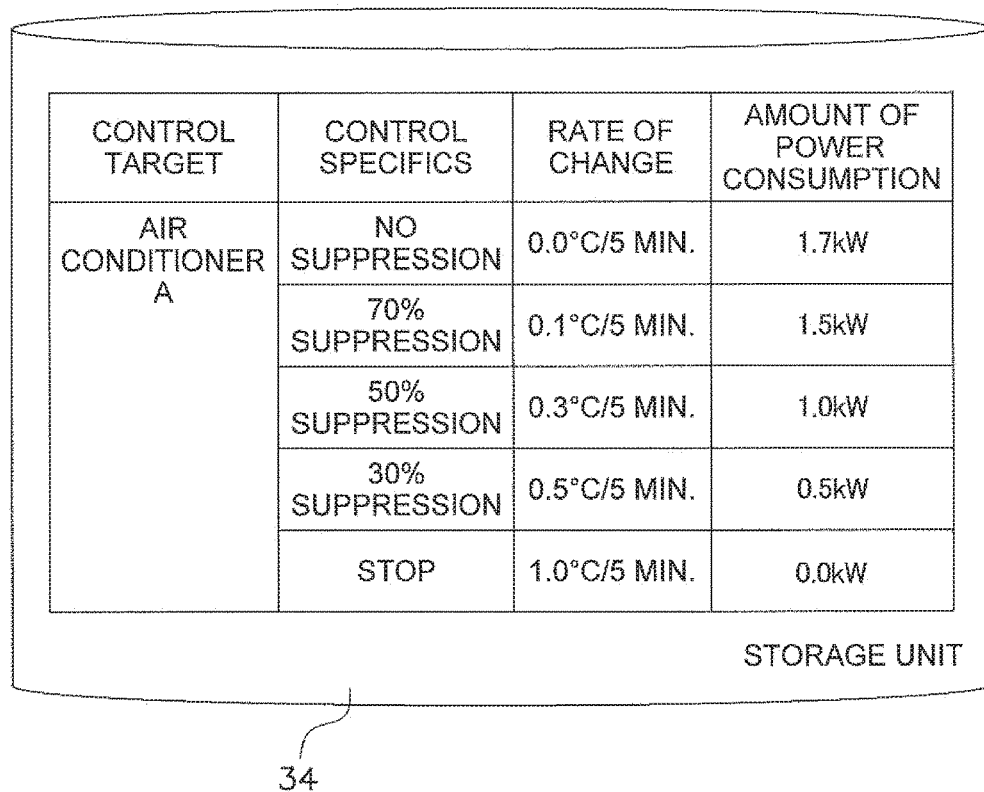
FIG. 25 is a schematic drawing illustrating the configuration of the storage unit 34 in Modification Example 1D.

Next, the additional adjustment amount calculation unit 36d1 determines the control specifics with the lowest amount of power consumption, among the control specific candidates for which the rate of change is lower than the maximum rate of change, as the additional control specifics. As illustrated in FIG. 25, the additional control specifics are stored in the storage unit 34 in association with the facility device to be controlled, the rate of change, and the amount of power consumption. In the example illustrated in FIG. 25, when the facility device 20 is the air conditioner A, the rates of change of 0.0° C./5 min., 0.1° C./5 min., 0.3° C./5 min., 0.5° C./5 min., and 1.0° C./5 min.; and the amounts of power consumption of 1.7 kW, 1.5 kW, 1.0 kW, 0.5 kW, and 0.0 kW are respectively associated with the control specifics of "No suppression," "70% suppression," "50% suppression," "30% suppression," and "Stop."

Then, the additional adjustment amount calculation unit 36d1 calculates the difference between the amount of power consumed under the current control condition and the amount of power consumed under the additional control as the additional adjustment amount. In the case of the example illustrated in FIG. 25, when the amount of power consumption of the air conditioner is in an unsuppressed state ("No suppression") and the maximum rate of change is calculated as less than 0.4° C., the additional adjustment amount calculation unit 36d1 selects "50% suppression" as the additional control specifics. Then, the additional adjustment amount calculation unit 36d1 calculates an additional adjustment amount of [0.7 kW] from the difference between the [1.7 kW] amount of power consumption corresponding to the control specifics of "No suppression" and the [1.0 kW] amount of power consumption corresponding to the control specifics of "50% suppression."

The additional incentive calculation unit 36d2 is a component that calculates an additional incentive estimated amount when the additional adjustment amount is calculated by the additional adjustment amount calculation unit 36d1. Specifically, the additional incentive calculation unit 36d2 calculates the additional incentive estimated amount on the basis of the additional adjustment amount, the incentive unit price, and the remaining time of the DR control period as shown in Equation (2) below:

Additional Incentive Estimated Amount [JPY]=Remaining Time [min.]×Additional Adjustment Amount [kW]×Incentive Unit Price [JPY/kW]    (2).

The additional control determination unit 36d3 determines whether or not to execute the additional control depending on the calculation results of the additional incentive estimated amount. Specifically, the additional control determination unit 36d3 determines to execute the additional control when the additional incentive estimated amount is greater than or equal to a "minimum amount for executing additional control" set as desired by the user, and determines not to execute the additional control when the additional incentive estimated amount is less than the minimum amount for executing additional control. When the additional control determination unit 36d3 has determined to execute the additional control, the additional control determination unit 36d3 sends an additional control execution command to the control condition change unit 36c.

Additionally, the additional control determination unit 36d3 is not limited to automatically determining whether or not to execute additional control, and a configuration is possible in which the additional control determination unit 36d3 confirms with the user whether or not to execute the additional control prior to the determination of the additional control. In this case, the additional control determination unit 36d3 displays the additional incentive estimated amount, the additional control specifics, the additional adjustment amount, and the like on the output unit 33, and receives instructions via the input unit 32 as to whether or not to execute the additional control. Then, when instructions to execute the additional control are received from the user, or when instructions not to execute the additional control are not received from the user within a predetermined period of time, the additional control determination unit 36d3 sends the additional control execution command to the control condition change unit 36c.

The control apparatus 30D according to Modification Example 1D is provided with the configuration described above and, as such, performs the following operations. First, upon generation of the calculation start trigger, the additional adjustment amount calculation unit 36d1 calculates the additional control specifics and the additional adjustment amount. Then, when the additional adjustment amount calculation unit 36d1 has calculated the additional adjustment amount, the additional incentive calculation unit 36d2 calculates the additional incentive estimated amount. Next, the additional control determination unit 36d3 determines whether or not to execute the additional control depending on the calculation results of the additional incentive estimated amount. When the additional control determination unit 36d3 has determined to execute the additional control, the additional control determination unit 36d3 sends the additional control execution command to the control condition change unit 36c. Upon receipt of the additional control execution command, the control condition change unit 36c changes the control condition of the facility device 20 so as to satisfy the additional control specifics. Here, depending on the additional adjustment amount, the control condition change unit 36c changes the control condition to increase the suppression of the amount of power consumption. Then, the control unit 37 controls the facility device 20 on the basis of the control condition changed by the control condition change unit 36c.

Thus, the control apparatus 30D according to Modification Example 1D is provided with the control condition change unit 36c that changes the preset control condition of the facility device 20 depending on the processing results of the additional control processing unit 36d when there is variation (shift in the comfort prediction) in the derivation element of the incentive during the DR adjustment period; and the control unit 37 that controls the facility device 20 on the basis of the control condition changed by the control condition change unit 36c after the variation has occurred in the derivation element of the incentive.

Figure 26:
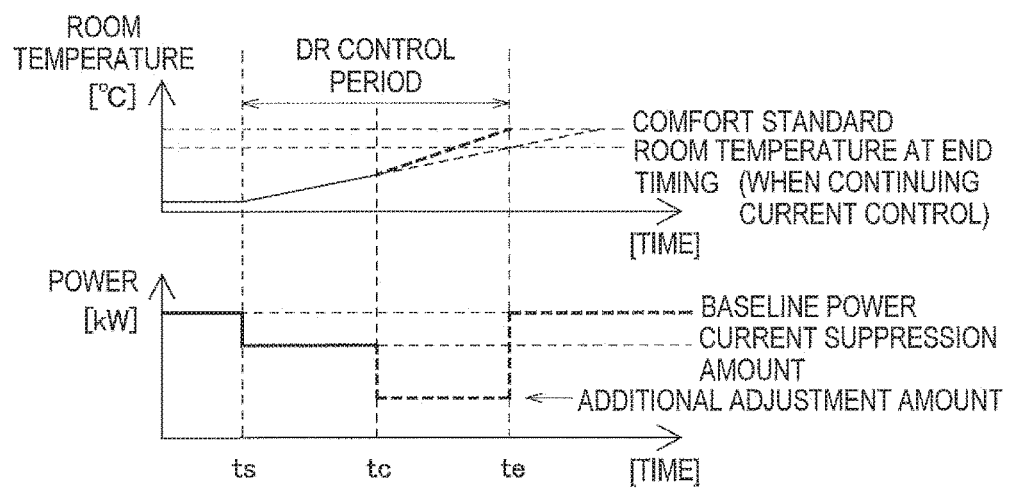
FIG. 26 is a diagram illustrating the actions of the control apparatus 30D according to Modification Example 1D.

Moreover, according to the control apparatus 30D, the facility device 20 can be optimally controlled, even in situations such as when there is a margin in the comfort. For example, when there is margin in the comfort as illustrated in FIG. 26, the control apparatus 30D performs additional control at the timing tc to increase the suppression of the amount of power consumption and, as a result, more incentives can be earned.

Note that the rate of change illustrated in FIG. 25 can be found from previous actual values. The previous value can be used as the actual value or, when a plurality of data exists, the average value, minimum value, or other values may be used. More specifically, the actual value of the rate of change can be found from data associated with each of the control specifics, data associated with each of the control specifics and differences between inside and outside temperatures (because it is anticipated that the air conditioning load is proportional to the difference between inside and outside temperatures and the rate of change increases when the difference in temperature is great), data associated with each of the control specifics and temperature differences relative to a reference temperature (because the rate of change increases as the temperature difference increases), and the like. The rate of change may also be found by referencing the values of similar properties. Additionally, the rate of change may be found by carrying out simulations using outside temperatures and thermal resistance values.

Moreover, the amount of power consumption illustrated in FIG. 25 can be found using actual values in the past. Specifically, the actual value of the amount of power consumption can be found from data associated by the control specifics, data associated by the control specifics and the outside temperatures (because the coefficient of performance (COP) is affected by the outside temperature and the like. The amount of power consumption may also be found by referencing the values of similar properties. Additionally, the amount of power consumption may be found from a rated value.

Note that, in Modification Example 1D, temperature is given as an example of the index value of comfort, but the index value of comfort is not limited thereto and may be lighting intensity, ventilation $CO_2$ concentration, or the like.

(7-5) Modification Example 1E

Figure 27:
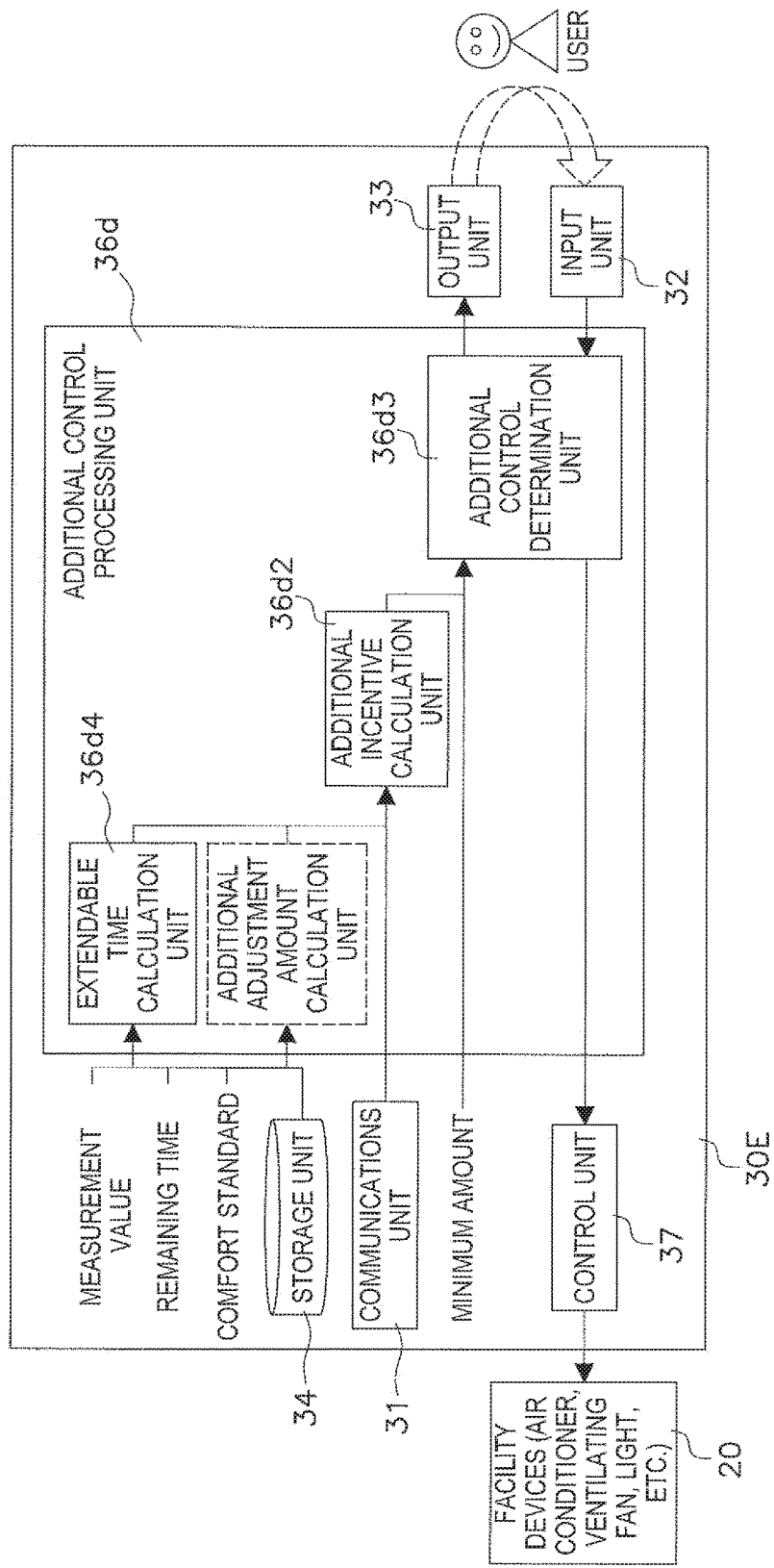
FIG. 27 is a schematic drawing illustrating a configuration of an additional control processing unit 36d of Modification Example 1E.

As in Modification Example 1D, a control apparatus 30E according to Modification Example 1E is provided with the additional control processing unit 36d. However, as illustrated in FIG. 27, the additional control processing unit 36d according to Modification Example 1E is provided with an extendable time calculation unit 36d4 in place of the additional adjustment amount calculation unit 36d1 of Modification Example 1D.

Upon receipt of a calculation start trigger, the extendable time calculation unit 36d4 calculates an extendable amount of time. Here, a calculation start trigger is generated when, for example, the remaining time of the DR control reaches a predetermined amount of time (remaining time x minutes); when a predetermined amount of time has elapsed from the start timing of the DR control (x minutes from start of adjustment); when a shift has occurred between the measurement temperature of the air conditioner and the temperature of the comfort standard; when the measurement temperature of the air conditioner reaches a predetermined value (current temperature of y° C.); or when a user inputs a calculation start request.

Specifically, the extendable time calculation unit 36d4 calculates an extendable amount of time on the basis of the comfort standard, a measurement value of a sensor, and the remaining time of the DR control period. For example, when the facility device 20 is an air conditioner, the extendable time calculation unit 36d4 calculates a margin temperature from the temperature corresponding to the comfort standard and the current temperature measured by a thermometer. Next, the extendable time calculation unit 36d4 calculates a rate of temperature change from the current temperature measured by the thermometer and a temperature at a predetermined earlier time. That is, the extendable time calculation unit 36d4 calculates the rate of temperature change using the following equation:

Rate of Temp. Change=(Current Temp.−Temp. $A$ min. Earlier)/$A$ min.

Next, the extendable time calculation unit 36d4 calculates the extendable amount of time on the basis of the margin temperature and the rate of temperature change as shown in Equation (3) below:

Extendable Amount of Time [min.]=Margin Temperature [° C.]+Rate of Temp. Change [° C./min.]−Remaining Time [min.]     (3).

The additional incentive calculation unit 36d2 calculates the additional incentive estimated amount when the extendable amount of time is calculated by the extendable time calculation unit 36d4. Specifically, the additional incentive calculation unit 36d2 calculates the additional incentive estimated amount on the basis of the extendable amount of time, the suppression amount, and the incentive unit price as shown in Equation (4) below. Note that the suppression amount is defined by the difference between the baseline power at the time of the next DR control and the current power. Additionally, it is presumed that the current DR control period is continuous with the next DR control period.

Additional Incentive Estimated Amount [JPY]=Extendable Amount of Time [min.]×Suppression Amount [kW]×Incentive Unit Price [JPY/kW]  (4)

Suppression Amount≡Baseline Power at Next Time−Current Power

As described above, the control apparatus 30E according to Modification Example 1E is provided with the configuration described above and, as such, performs the following operations. First, upon generation of the calculation start trigger, the extendable time calculation unit 36d4 calculates the extendable amount of time. The additional incentive calculation unit 36d2 calculates the additional incentive estimated amount when the extendable time calculation unit 36d4 has calculated the extendable amount of time. Next, the additional control determination unit 36d3 determines whether or not to execute the additional control depending on the calculation results of the additional incentive estimated amount. When the additional control determination unit 36d3 has determined to execute the additional control, the additional control determination unit 36d3 sends the additional control execution command to the control condition change unit 36c. Upon receipt of the additional control execution command, the control condition change unit 36c changes the control condition of the facility device 20 so as to satisfy the additional control specifics. Here, the control condition change unit 36c changes the control condition so as to carry out DR control including the extendable amount of time. Then, the control unit 37 controls the facility device 20 on the basis of the control condition changed by the control condition change unit 36c.

Thus, the control apparatus 30E according to Modification Example 1E is provided with the control condition change unit 36c that changes the preset control condition of the facility device 20 depending on the processing results of the additional control processing unit 36d when there is variation (shift in the comfort prediction) in the derivation element of the incentive during the DR adjustment period; and the control unit 37 that controls the facility device 20 on the basis of the control condition changed by the control condition change unit 36c after the variation has occurred in the derivation element of the incentive.

Figure 28:
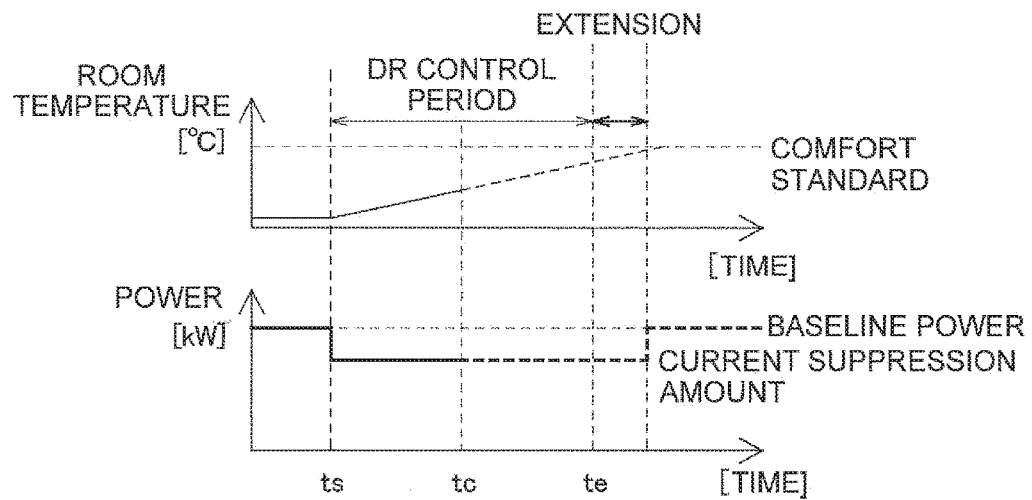
FIG. 28 is a diagram illustrating the actions of the control apparatus 30E according to Modification Example 1E.

Moreover, according to the control apparatus 30E, the facility device 20 can be optimally controlled, even in situations such as when there is margin in the comfort. For example, as illustrated in FIG. 28, when there is margin in the comfort, the control apparatus 30E performs suppression of the amount of power consumption beyond the end timing to of the DR control period and, as a result, more incentives can be earned.

Note that, in Modification Example 1E, temperature is given as an example of the index value of comfort, but the index value of comfort is not limited thereto and may be lighting intensity, ventilation $CO_2$ concentration, or the like.

<Additional Description>

The invention is not limited to the specific details and representative embodiments shown and described herein, and in an implementation phase, various types of modifications may be made without departing from the spirit or scope of the general inventive concept of the invention. Various types of the invention can be formed by appropriately combining a plurality of the constituent elements disclosed in the foregoing embodiments. Some of the elements, for example, may be omitted from the whole of the constituent elements shown in the embodiments mentioned above. Furthermore, the constituent elements over different embodiments may be appropriately combined.

What is claimed is:

1. A control apparatus configured to control a facility device and to be used in an energy consumption management system in which a supply-side entity grants an incentive to a user of the facility device when the facility device performs an adjustment of an amount of energy consumption for a predetermined adjustment period in response to an adjustment request, the supply-side entity being an energy supply business operator, an energy distributor, or an aggregator, the control apparatus comprising:
 a processor;
 a network interface; and
 a storage device,
 the control apparatus being configured to:
  receive a setting of an incentive standard from the user, the incentive standard being a standard of the incentive, and
  receive a setting of a comfort standard indicating comfort of a space around the facility device, and
 the control apparatus being further configured, by executing a program stored in the storage device, to
  change a control condition of the facility device and to calculate an incentive prediction indicating a prediction of the incentive,
  change a preset control condition of the facility device and to calculate a comfort prediction indicating a prediction of comfort when there is variation in a derivation element of the incentive during the adjustment period,
  determine whether or not the incentive prediction and the comfort prediction are respectively within ranges of the incentive standard and the comfort standard, and, based on determination results, change the preset control condition of the facility device when there is variation in the derivation element of the incentive during the adjustment periods, and
  a control unit configured to control the facility device based on the changed control condition after the variation has occurred in the derivation element of the incentive.

2. The control apparatus according to claim 1, wherein the controller is further configured to
 receive a setting of a priority indicating which of the incentive standard and the comfort standard is to be prioritized, and
 determine the control condition of the facility device based on the incentive prediction, the incentive standard, the comfort prediction, the comfort standard, and the priority.

3. The control apparatus according to claim 1, wherein the control apparatus is further configured to
 sequentially change the preset control condition of the facility device to a plurality of control conditions and to calculate a plurality of incentive predictions when there is variation in the derivation element of the incentive, and
 determine the control condition of the facility device based on the plurality of incentive predictions and the incentive standard.

4. The control apparatus according to claim 1, wherein the control apparatus is further configured to
   sequentially change the preset control condition of the facility device to a plurality of control conditions and to calculate a plurality of comfort predictions when there is variation in the derivation element of the incentive, and
   determine the control condition of the facility device based on the plurality of comfort predictions and the comfort standard.

5. The control apparatus according to claim 1, wherein the control apparatus is further configured to
   store the control condition in association with a control state at the time the derivation element of the incentive varied in the storage device, and
   read the control condition from the storage device based on the control state, when there is Variation in the derivation element of the incentive.

6. The control apparatus according to claim 1, wherein the control apparatus is connected to the facility device via a network.

7. The control apparatus according to claim 2, wherein the control apparatus is further configured to
   sequentially change the preset control condition of the facility device to a plurality of control conditions and to calculate a plurality of incentive predictions when there is variation in the derivation element of the incentive, and
   determine the control condition of the facility device based on the plurality of incentive predictions and the incentive standard.

8. The control apparatus according to claim 2, wherein the control apparatus is further configured to
   sequentially change the preset control condition of the facility device to a plurality of control conditions and to calculate a plurality of comfort predictions when there is variation in the derivation element of the incentive, and
   determine the control condition of the facility device based on the plurality of comfort predictions and the comfort standard.

9. The control apparatus according to claim 2, further wherein
   the control apparatus is configured to
      store the control condition in association with a control state at the time the derivation element of the incentive varied in the storage device, and
      read the control condition from the storage device based on the control state, when there is variation in the derivation element of the incentive.

10. The control apparatus according to claim 2, wherein the control apparatus is connected to the facility device via a network.

11. The control apparatus according to claim 3, wherein the control apparatus is further configured to
    sequentially change the preset control condition of the facility device to a plurality of control conditions and to calculate a plurality of comfort predictions when there is variation in the derivation element of the incentive, and
    determine the control condition of the facility device based on the plurality of comfort predictions and the comfort standard.

12. The control apparatus according to claim 3, wherein the control apparatus is configured to
    store the control condition in association with a control state at the time the derivation element of the incentive varied in the storage device, and
    read the control condition from the storage device based on the control state, when there is variation in the derivation element of the incentive.

13. The control apparatus according to claim 3, wherein the control apparatus is connected to the facility device via a network.

14. The control apparatus according to claim 4, wherein the control apparatus is configured to
    store the control condition in association with a control state at the time the derivation element of the incentive varied in the storage device, and
    read the control condition from the storage device based on the control state, when there is variation in the derivation element of the incentive.

15. The control apparatus according to claim 4, wherein the control apparatus is connected to the facility device via a network.

16. The control apparatus according to claim 5, wherein the control apparatus is connected to the facility device via a network.

* * * * *